(12) United States Patent
Komatsu

(10) Patent No.: US 9,204,017 B2
(45) Date of Patent: Dec. 1, 2015

(54) IMAGE PROCESSING DEVICE, IMAGE PROCESSING METHOD, AND COMPUTER PROGRAM PRODUCT

(71) Applicant: Manabu Komatsu, Tokyo (JP)

(72) Inventor: Manabu Komatsu, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/570,180

(22) Filed: Dec. 15, 2014

(65) Prior Publication Data

US 2015/0172514 A1    Jun. 18, 2015

(30) Foreign Application Priority Data

Dec. 16, 2013  (JP) ................................ 2013-259385

(51) Int. Cl.
  *H04N 1/04*   (2006.01)
  *H04N 1/60*   (2006.01)
  *H04N 1/00*   (2006.01)
  *H04N 1/407*  (2006.01)

(52) U.S. Cl.
  CPC ......... *H04N 1/6077* (2013.01); *H04N 1/00005* (2013.01); *H04N 1/00018* (2013.01); *H04N 1/00023* (2013.01); *H04N 1/00045* (2013.01); *H04N 1/00087* (2013.01); *H04N 1/00806* (2013.01); *H04N 1/00819* (2013.01); *H04N 1/4078* (2013.01); *H04N 1/6094* (2013.01); *H04N 2201/0006* (2013.01); *H04N 2201/0081* (2013.01)

(58) Field of Classification Search
  CPC ............ H04N 1/6077; H04N 1/00005; H04N 1/00018; H04N 1/00023; H04N 1/00045; H04N 1/00087; H04N 1/00806; H04N 1/00819; H04N 1/4078; H04N 1/6094
  USPC ................................. 358/518, 505, 474, 488
  See application file for complete search history.

(56) References Cited

U.S. PATENT DOCUMENTS 8,072,645 B2    12/2011  Komatsu
8,917,406 B2 *  12/2014  Nakai et al. .................. 358/1.14

(Continued)

FOREIGN PATENT DOCUMENTS

| JP | 2001-268379 | 9/2001 |
| JP | 2002-252785 | 9/2002 |
| JP | 2004-112494 | 4/2004 |

(Continued)

*Primary Examiner* — Houshang Safaipour
(74) *Attorney, Agent, or Firm* — Oblon, McClelland, Maier & Neustadt, L.L.P.

(57) ABSTRACT

An image processing device includes: an automatic color determining module that determines whether an image read from an original is a color image or a monochrome image according to a color determination result obtained by a color determining module; a color determination difference detecting module that detects a difference between a color determination result obtained by the color determining module with respect to a test pattern output on a recording medium and a color determination result obtained by the color determining module with respect to the test pattern output on a standard recording medium; and an automatic color selection condition adjusting module that adjusts a white pixel determination threshold and a black pixel determination threshold used for determination by the automatic color determining module according to a color determination difference detection result obtained by the color determination difference detecting module.

10 Claims, 21 Drawing Sheets

(56) References Cited

U.S. PATENT DOCUMENTS

2007/0002346 A1* 1/2007 Nakane .................. 358/1.9
2011/0310446 A1 12/2011 Komatsu

FOREIGN PATENT DOCUMENTS

| | | |
|---|---|---|
| JP | 2005-005802 | 1/2005 |
| JP | 2005-175875 | 6/2005 |
| JP | 2005-260801 | 9/2005 |
| JP | 2006-211093 | 8/2006 |
| JP | 2006-245850 | 9/2006 |
| JP | 2007-028148 | 2/2007 |
| JP | 2007-194810 | 8/2007 |
| JP | 2008-178047 | 7/2008 |
| JP | 2008-311796 | 12/2008 |
| JP | 2009-218954 | 9/2009 |
| JP | 2010-166506 | 7/2010 |
| JP | 2011-071659 | 4/2011 |
| JP | 2011-155352 | 8/2011 |
| JP | 2012-029276 | 2/2012 |

* cited by examiner

FIG.4
FIG.5
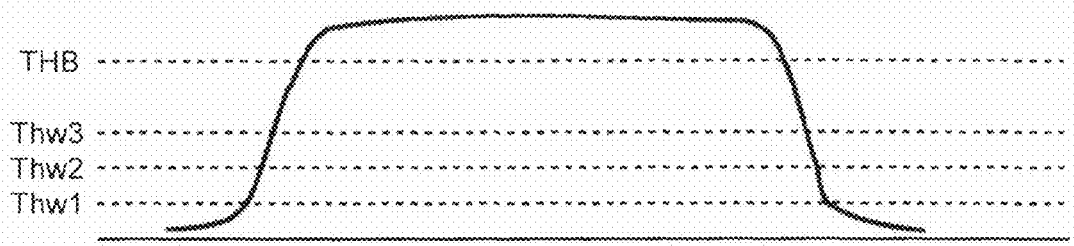
FIG.6
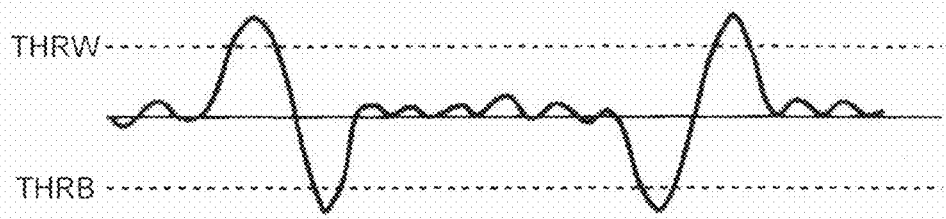

FIG.26

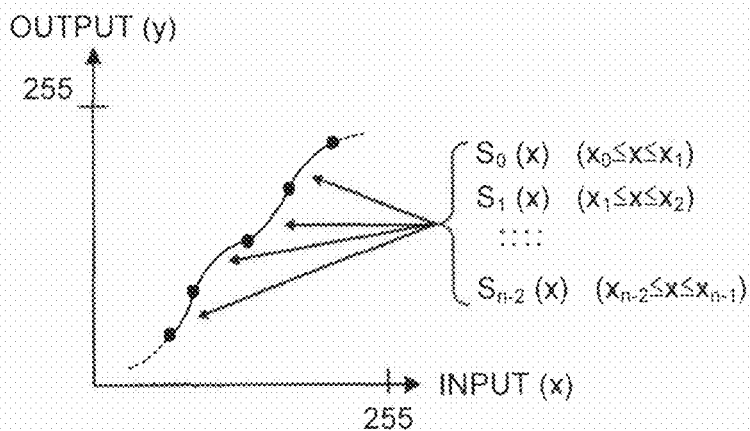

OUTPUT (y)

255

$S_0(x)$  $(x_0 \leq x \leq x_1)$
$S_1(x)$  $(x_1 \leq x \leq x_2)$
⋮
$S_{n-2}(x)$  $(x_{n-2} \leq x \leq x_{n-1})$ INPUT (x)
255

FIG. 12, EXAMPLE OF LINE GRAPH INTERPOLATION
(NUMBER OF VALID CONTROL POINTS IS n)

[BOUNDARY CONDITION OF INTERPOLATION
EXPRESSION]

(1) $S_t(x_{t+1}) = S_{t+1}(x_{t+1}) = y_{t+1}$     $t = 0, 1, 2, \cdots, n-3$
(2) $S_t'(x_{t+1}) = S_{t+1}'(x_{t+1})$     $t = 0, 1, 2, \cdots, n-3$
(3) $S_t''(x_{t+1}) = S_{t+1}''(x_{t+1})$     $t = 0, 1, 2, \cdots, n-3$
(4) $S_0(x_0) = y_0$
(5) $S_{n-2}(x_{n-1}) = y_{n-1}$
(6) $S_0''(x_0) = S_{n-2}''(x_{n-1}) = 0$ IF St (x)<0, CORRECTED TO St (x)=0
IF St (x)>255, CORRECTED TO St (x)=0255

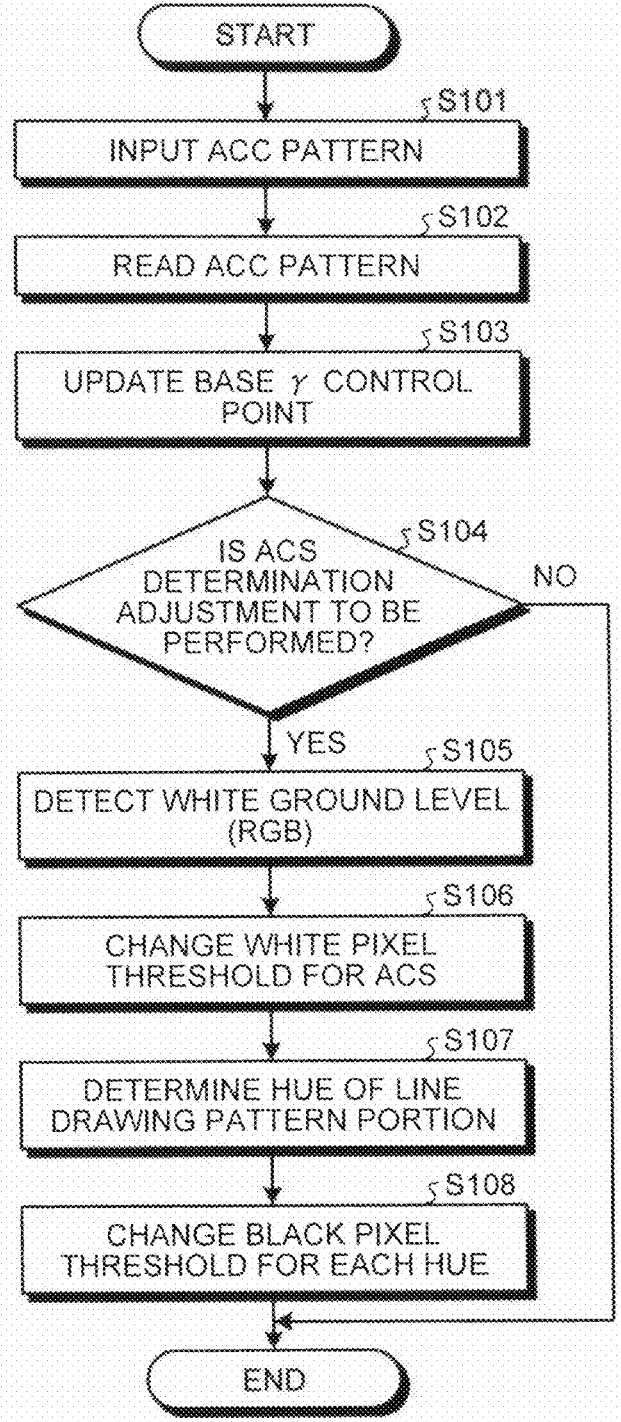

IMAGE PROCESSING DEVICE, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-259385 filed in Japan on Dec. 16, 2013.

BACKGROUND OF THE INVENTION

1. Field of the Invention

The present invention relates to an image processing device, an image processing method, and a computer program product.

2. Description of the Related Art

A technique has been already known that relates to an auto color select (hereinafter, referred to as "ACS") function for automatically determining whether an image input by a scanner is a color image or a monochrome image to perform suitable processing according to the determination result.

Japanese Laid-open Patent Publication No. 2001-268379 discloses an invention related to an image processing device having the ACS function. Japanese Laid-open Patent Publication No. 2001-268379 discloses a configuration including an image reading unit that reads an image of an original and outputs image data, an ACS determining unit that determines whether the original is a color original or a monochrome original based on the image data, an input module for manually inputting whether the original is a color original or a monochrome original from a panel surface, and a condition changing module that changes a determination condition in the ACS determining unit according to a result input with the input module.

In the invention disclosed in Japanese Laid-open Patent Publication No. 2001-268379, ACS determination can be customized because whether a read original selected by a user is a color image or a monochrome image is input manually. However, an operation is complicated because it is necessary to manually input whether the selected original is a color image or a monochrome image.

In Japanese Laid-open Patent Publication No. 2001-268379, only change of an ACS determination condition according to the entire color level detected in the read original used to customize the ACS determination condition is performed. Due to this, there is no versatility for originals having different printing contents. Specifically, there is a variation between the read originals due to color tones of paper whites of the used originals and a scanner characteristic, so that a problem such as the following is caused. For example, when originals including color originals and monochrome originals are copied in an ACS mode, some of the monochrome originals may be determined as a color original, so that an image is not appropriately processed.

In view of such a situation, there is a need to provide an image processing device that improves determination accuracy in color auto selection and improves convenience of an operation.

SUMMARY OF THE INVENTION

It is an object of the present invention to at least partially solve the problems in the conventional technology.

An image processing device includes: an original reading module that reads an image from an original; a color determining module that performs division determination into color regions including at least black and white for each pixel on the image read from the original by the original reading module; an automatic color determining module that determines whether the image read from the original by the original reading module is a color image or a monochrome image according to a color determination result obtained by the color determining module; a test pattern output module that outputs a test pattern including at least an edge portion of a black region on a recording medium; a color determination difference detecting module that detects a difference between a color determination result obtained by the color determining module with respect to the test pattern output on the recording medium by the test pattern output module and a color determination result obtained by the color determining module with respect to the test pattern output on a standard recording medium set as a standard in advance; and an automatic color selection condition adjusting module that adjusts a white pixel determination threshold and a black pixel determination threshold used for determination by the automatic color determining module according to a color determination difference detection result obtained by the color determination difference detecting module.

An image processing method includes: reading an image from an original with an original reading module and storing the read image in a storage unit; performing division determination into color regions including at least black and white for each pixel on the image stored in the storage unit, and storing a color determination result in the storage unit; automatically determining whether the image stored in the storage unit is a color image or a monochrome image according to the color determination result stored in the storage unit, and storing a determination result in the storage unit; outputting a test pattern including at least an edge portion of a black region on a recording medium; detecting a difference between a color determination result with respect to the test pattern output on the recording medium and a color determination result with respect to the test pattern output on a standard recording medium set as a standard in advance, and storing a detected color determination difference detection result in the storage unit; and adjusting a white pixel determination threshold and a black pixel determination threshold used for the automatic color determination according to the color determination difference detection result stored in the storage unit.

A computer program product includes a non-transitory computer-readable medium containing an information processing program. The program causes a computer to perform: reading an image from an original with an original reading module and storing the read image in a storage unit; performing division determination into color regions including at least black and white for each pixel on the image stored in the storage unit, and storing a color determination result in the storage unit; automatically determining whether the image stored in the storage unit is a color image or a monochrome image according to the color determination result stored in the storage unit, and storing a determination result in the storage unit; outputting a test pattern including at least an edge portion of a black region on a recording medium; detecting a difference between a color determination result with respect to the test pattern output on the recording medium and a color determination result with respect to the test pattern output on a standard recording medium set as a standard in advance, and storing a detected color determination difference detection result in the storage unit; and adjusting a white pixel determination threshold and a black pixel determination threshold used for the automatic color determination according to the color determination difference detection result stored in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram for explaining an operation of detecting a white region or a black region in a line-drawing recognizing unit according to the embodiment of the present invention;

FIG. 5 is a schematic diagram illustrating a relation of the white region, the black region, and a threshold with respect to a line drawing according to the embodiment of the present invention;

FIG. 6 is a schematic diagram illustrating a relation of an edge amount [x] according to the embodiment of the present invention;

FIG. 26 is a schematic diagram explaining a method of creating a γ table according to the embodiment of the present invention;

FIG. 27 is a flowchart illustrating an adjustment procedure of the ACS determination condition according to the embodiment of the present invention;

DETAILED DESCRIPTION OF THE PREFERRED EMBODIMENTS

Figure 1:
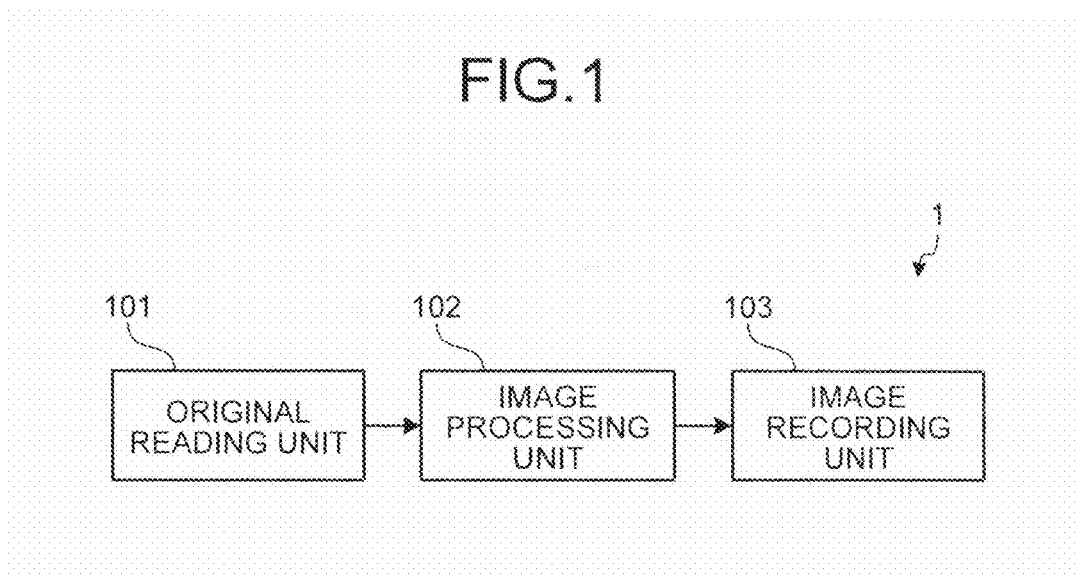
FIG. 1 is a schematic configuration diagram of an image processing device according to an embodiment of the present invention.

The following describes an image processing device according to the embodiment of the present invention using the appended drawings. However, the embodiment is not limited thereto unless it departs from the gist of the invention. In the drawings, the same or similar portions are denoted by the same reference numerals, and redundant description is appropriately simplified or omitted.

Schematically, the image processing device according to the embodiment is an image processing device having a correction function with respect to an image input/output device in which division determination into color regions including at least black and white for each pixel is performed on an image pattern including an edge portion of a black region formed on a recording medium and an image read by a scanner of a paper white portion, that is, a background portion to adjust at least a threshold for determining a white pixel based on a determination result with respect to a standard sheet and a threshold for determining a black pixel set for each hue.

Hereinafter, the following describes the image processing device according to the embodiment of the present invention in detail with reference to FIG. 1. An image processing device 1 according to the embodiment includes an original reading unit 101, an image processing unit 102, and an image recording unit 103.

The original reading unit 101 is an original reading module that reads image data from an original and converts the image data as an analog signal into digital data to be output. The image processing unit 102 performs various correction processing on the image data converted into the digital data, and also performs original recognition such as line-drawing recognition and color determination. The image recording unit 103 records the image on a recording sheet based on the image data from the image processing unit 102.

It is assumed here that the original reading unit 101 reads color image data of three colors, that is, red (R), green (G), and blue (B) (hereinafter, referred to as "RGB data"). The image processing unit 102 is assumed to cause the RGB data to be subjected to color conversion into color image data of four colors, that is, cyan (C), magenta (M), yellow, and black (Bk) (hereinafter, referred to as "CMYBk data"). The image recording unit 103 is assumed to output the color image to the recording sheet based on the CMYBk data.

Figure 2:
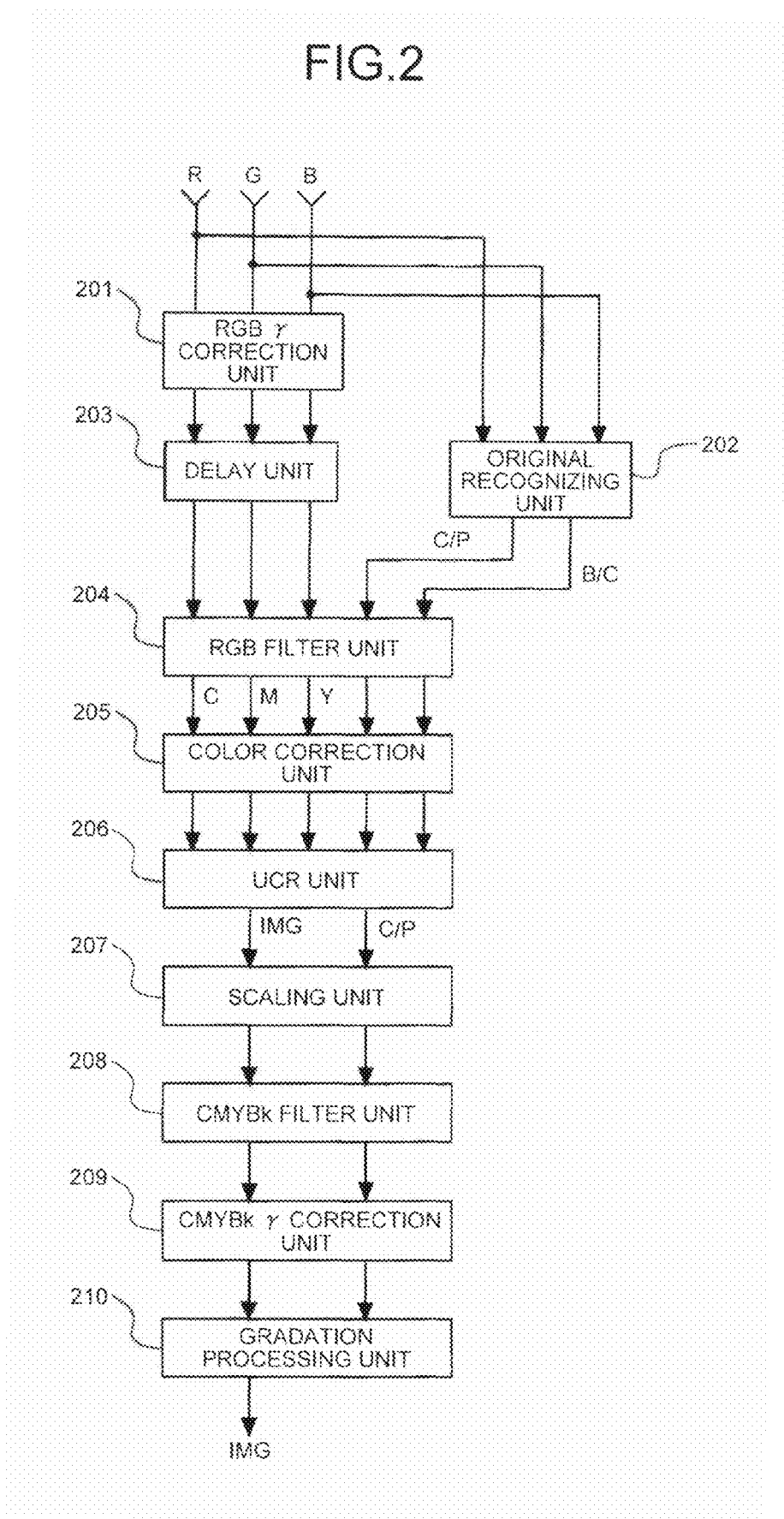
FIG. 2 is a block diagram illustrating an internal structure of an image processing unit according to the embodiment of the present invention.

Next, the following describes an internal structure of the image processing unit 102 included in the image processing device 1 according to the embodiment with reference to FIG. 2. The image processing unit 102 according to the embodiment includes an RGB γ correction unit 201, an original recognizing unit 202, a delay unit 203, an RGB filter unit 204, a color correction unit 205, a UCR unit 206, a scaling unit 207, a CMYBk filter unit 208, a CMYBk γ correction unit 209, and a gradation processing unit 210.

The RGB γ correction unit 201 receives the RGB data as digital data input from the original reading unit 101 and corrects gray balance of the RGB data. At the same time, the RGB γ correction unit 201 converts reflectivity data of the RGB data into density data of the RGB data.

The original recognizing unit 202 determines whether the RGB data input from the original reading unit 101 is a character region or a pattern region, and outputs a character separation signal C/P signal to the RGB filter unit 204 described later. At the same time, the original recognizing unit 202 determines whether the data is a chromatic region or an achromatic region of an original region, and outputs a color region signal B/C signal to the RGB filter unit 204. The character separation signal C/P signal is a signal representing a character edge region or a pattern region. The color region signal B/C signal is a signal representing a chromatic region or an achromatic region.

The delay unit 203 receives the RGB data input from the RGB γ correction unit 201 and delays the RGB data to be synchronized with an output result of the original recognizing unit 202.

The RGB filter unit 204 is a filter that performs MTF correction on the RGB data and is configured in a matrix of N×M. The RGB filter unit 204 performs sharpening processing when the C/P signal is "3", performs smoothing processing when the C/P signal is "0", and does not process the input data and outputs it to the next stage as it is when the C/P signal is "1".

The color correction unit 205 converts the RGB data into CMY data by primary masking and the like.

The UCR unit 206 causes a common portion of the CMY data to be subjected to under color removable (UCR) processing to generate Bk data. The UCR unit 206 is a unit for improving color reproduction of the image data. The UCR unit 206 performs the UCR processing on the common portion of the CMY data input from the color correction unit 205 to generate the Bk data, and outputs the CMYBk data.

The scaling unit 207 performs magnifying/reducing processing or unmagnifying processing in a main-scanning direction.

The CMYBk filter unit 208 performs the smoothing processing or the sharpening processing using a space filter of N×N according to the C/P signal and a frequency characteristic of the image recording unit 103.

The CMYBk γ correction unit 209 performs γ correction for changing and processing a γ curve according to the C/P signal and the frequency characteristic of the image recording unit 103. A γ curve faithfully reproducing the image is used when the C/P signal is "0", and the γ curve is stressed to emphasize a contrast when the C/P signal is other than "0".

The gradation processing unit 210 performs quantization such as dither processing and error diffusion processing according to the C/P signal and a gradation characteristic of the image recording unit 103. The gradation processing unit 210 performs processing focusing on a gradation when the C/P signal is "0", and performs processing focusing on a resolving power when the C/P signal is other than "0".

The C/P signal output from the original recognizing unit 202 is a 2-bit signal. The C/P signal "3" indicates a character region, "1" indicates a character on a pattern, and "0" indicates a pattern region.

The C/P signal is connected in cascade to the RGB filter unit 204, the color correction unit 205, the UCR unit 206, the scaling unit 207, the CMYBk filter unit 208, the CMYBk γ correction unit 209, and the gradation processing unit 210, and a signal IMG is output in synchronization with the image data.

The B/C signal is a 1-bit signal. The B/C signal H indicates an achromatic region, and L indicates a chromatic region. The B/C signal is connected in cascade to the RGB filter unit 204, the color correction unit 205, and the UCR unit 206, and is output in synchronization with the image data.

When the C/P signal is other than "3", Bk generation of skeleton black is performed. When the C/P signal is "3", full black processing is performed. When the C/P signal is "3" and the B/C signal is H, data of C/M/Y is erased. This is because a black character is represented only with a black component. The output signal IMG is one frame-sequential color for outputting one of C, M, Y, and Bk. That is, full-color data of four colors is assumed to be generated by reading the original four times.

With the configuration of each component of the image processing unit 102 described above, the image processing unit 102 performs smoothing processing using the RGB filter unit 204 to perform pattern processing, that is, when "C/P signal=0". The UCR unit 206 performs skeleton black processing, and the CMYBk γ correction unit 209 selects a curve focusing on a gradation property. In addition, the CMYBk filter unit 208 and the gradation processing unit 210 perform processing focusing on the gradation.

On the other hand, to perform character processing, that is, when "C/P signal=3", the RGB filter unit 204 performs emphasis processing and the UCR unit 206 performs full black processing. The CMYBk γ correction unit 209 selects a curve focusing on a contrast, and the CMYBk filter unit 208 and the gradation processing unit 210 performs processing focusing on a resolution.

In black character processing, that is, in CMY processing excluding Bk in which "C/P signal=3 and B/C signal=H", the CMY data is not printed. This process prevents the periphery of the black character from being colored due to misregistration. In this case, the RGB filtering of the Bk data may be more strongly performed than a color character to sharpen the character.

To perform pattern processing, that is, when "C/P signal=1", the RGB filter unit 204 performs weak emphasis processing or through processing that outputs the input data as it is. The UCR unit 206 performs full black processing, and the CMYBk γ correction unit 209 selects a curve focusing on the contrast. The CMYBk filter unit 208 and the gradation processing unit 210 perform processing focusing on the resolution. Processing such as black character processing is not performed in this case.

In this way, the image processing unit 102 can perform three types of processing including processing for the pattern, the edge of the character, and the character on the pattern.

Figure 3:
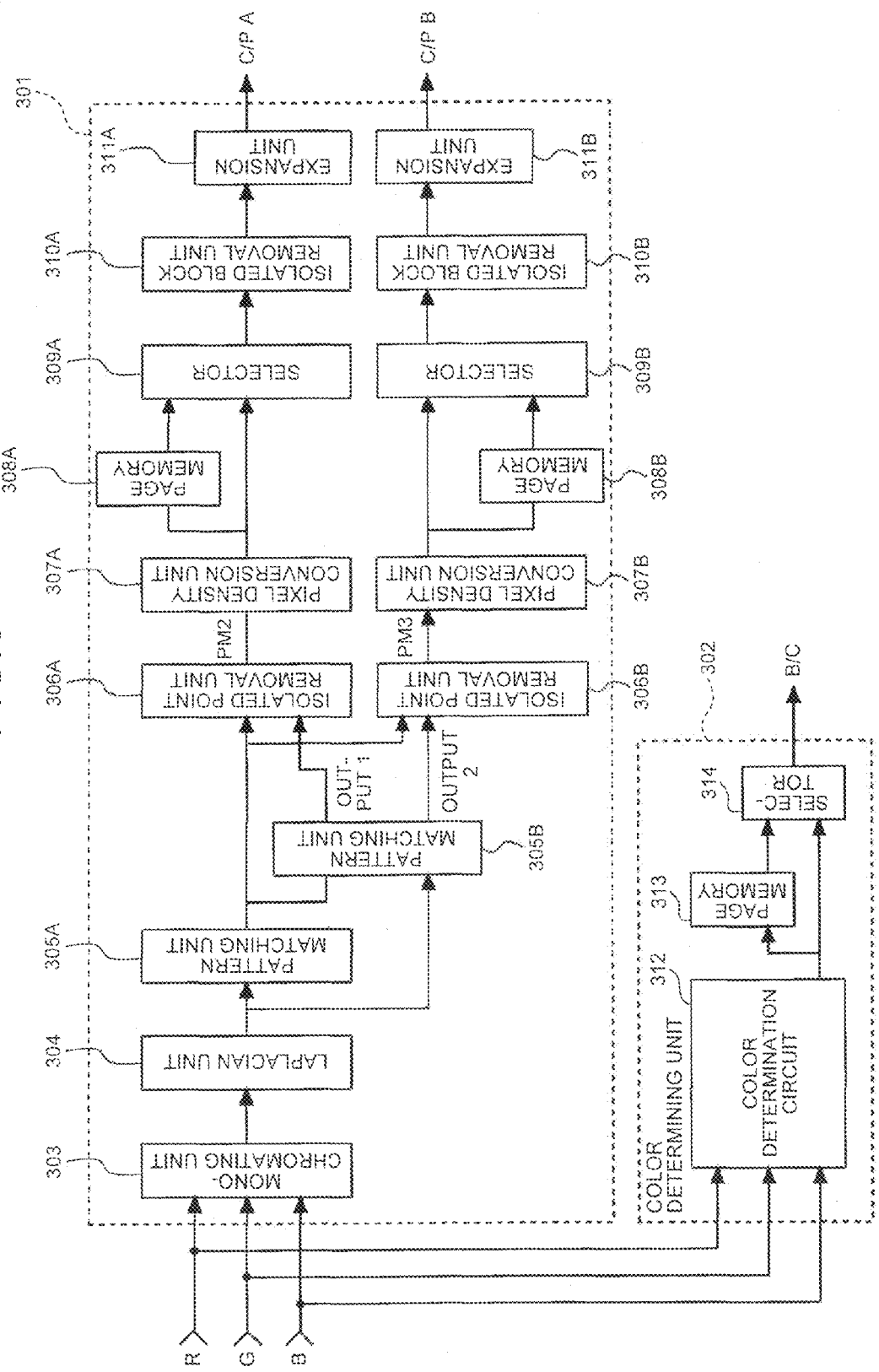
FIG. 3 is a block diagram illustrating an internal structure of an original recognizing unit according to the embodiment of the present invention.

Next, the following describes an internal structure of the original recognizing unit 202 according to the embodiment with reference to FIG. 3. The original recognizing unit 202 according to the embodiment is broadly divided into a line-drawing recognizing unit 301 that detects the essence of a line-drawing and a color determining unit 302 that determines whether a specific region of the original is chromatic or achromatic. The color determining unit 302 is a color determining module that performs division determination on the image read from the original by the original reading unit 101 into color regions including at least black and white for each pixel. The following describes an example of a case in which reading density of the original reading unit 101 is substantially 400 dpi.

The line-drawing recognizing unit 301 outputs the C/P signal. Output logic thereof is such that "3" is output in a case of an edge of a line drawing, "1" is output in a case of an edge of a line drawing on a pattern, and "0" is output in other cases.

As illustrated in the drawing, the line-drawing recognizing unit 301 includes a monochromating unit 303, a Laplacian unit 304, pattern matching units 305A and 305B, isolated point removal units 306A and 306B, pixel density conversion units 307A and 307B, page memories 308A and 308B, selectors 309A and 309B, isolated block removal units 310A and 310B, and expansion units 311A and 311B.

The line-drawing recognizing unit 301 outputs C/PA and C/PB. The C/P signal is "0" when C/PA and C/PB are [L, L], the C/P signal is "1" when C/PA and C/PB are [L, H], and the C/P signal is "3" when C/PA and C/PB are [H, H]. C/PA and C/PB are collectively referred to as the C/P signal.

The original recognizing unit 202 determines whether the original read by the original reading unit 101 is a color original or a black-and-white original. In an automatic color selection mode, the original recognizing unit 202 determines whether the original is a color original or a black-and-white original when a first scan [Bk] image formation is performed. If the determination result is the black-and-white original, scanning is performed only once. On the other hand, if the determination result is the color original, scanning is performed four times. The original recognizing unit 202 functions as an automatic color determining module that determines whether the image read from the original by the original reading unit 101 is a color image or a monochrome image according to a color determination result obtained by the color determining unit 302. Details about the automatic color determination will be described later.

The color determining unit 302 outputs the B/C signal. Output logic thereof is such that L is output in a case of a chromatic region, and H is output in a case of an achromatic region. An output result is a signal in which 4×4 pixels are made correspond to 1 pixel. Hereinafter, a unit of the output result is assumed to be 1 block. As illustrated in the drawing, the color determining unit 302 includes a color determination circuit 312, a page memory 313, and a selector 314.

First, the following describes an operation of each component of the line-drawing recognizing unit 301 in detail. First, the RGB data input to the line-drawing recognizing unit 301 is converted into luminance data with the monochromating unit 303, and becomes a monochrome signal. The densest data among pieces of the RGB data may be selected to be the monochrome signal instead of the luminance data. Alternatively, G data may be used as the luminance data to be the monochrome signal. In any case, the output data output from the monochromating unit 303 represents dense data with a large number and represents sparse data with a small number.

The Laplacian unit 304 extracts the edge of the line drawing, and detects the white region and the black region at the same time. By detecting the white region, extraction data of the line drawing on a white background, that is, a candidate for a thin line can be obtained.

The following describes an operation of detecting the white region with reference to a symbolized matrix illustrated in FIG. 4. For example, assuming that the matrix of the white region is 3×3, the following relation is satisfied.

$((a_{00}<thw)$ and $(a_{01}<thw)$ and $(a_{02}<thw)$
   and $(a_{10}<thw)$ and $(a_{11}<thw)$ and $(a_{02}<thw))$
or $((a_{10}<thw)$ and $(a_{11}<thw)$ and $(a_{12}<thw)$
   and $(a_{11}<thw)$ and $(a_{21}<thw)$ and $(a_{22}<thw))$
or $((a_{00}<thw)$ and $(a_{10}<thw)$ and $(a_{20}<thw)$
   and $(a_{01}<thw)$ and $(a_{11}<thw)$ and $(a_{21}<thw))$
or $((a_{01}<thw)$ and $(a_{11}<thw)$ and $(a_{21}<thw)$
   and $(a_{11}<thw)$ and $(a_{12}<thw)$ and $(a_{22}<thw))$ When peripheral data including the target pixel is smaller than a threshold thw, it is nominated as the candidate for the white region. In this case, different values are used for a thick line and a thin line. As the candidate for the white region for a thick line, a typical value of a white background is set. As the candidate for the white region for a thin line, a value slightly lower than the typical value of the white background, that is, a value closer to white is set. The reason why the candidate for the white region for a thin line is caused to be closer to white is to prevent a highlight or a bright part of the pattern such as dots on printed matter or a parallel line tint of a copying machine from being the candidate for the white region.

Although this pattern exemplifies an orthogonal pattern, an oblique pattern and the like may be added.

To calculate the white region from the candidate for the white region, the Laplacian is obtained as follows.

$$x=(a_{22}\times2)-(a_{21}+a_{23})\times i$$

$$x=((a_{22}\times4)-(a_{11}+a_{13}+a_{31}+a_{33}))$$

$$x=(a_{22}\times2)-(a_{12}+a_{32})+x$$

Here, i is a weighting factor for correcting a difference in MTF between main scanning and sub-scanning or performing correction in scaling. When a value of x is in a range of a certain value "N", it is determined as the white region. The following expression is established.

$$-N<x<N$$

Here, the threshold for a thick line and the threshold for a thin line are not necessarily separated.

In this way, the white region for a thin line and the white region for a thick line are calculated. Accordingly, small dots on the highlight side on the pattern or a parallel line tint pattern are removed so as not to be extracted.

Next, the following describes the correction of the white region for a thick line. For example, in a case of black/white reversed character, that is, when the character is white and the periphery thereof is black, white data may be closer to black than usual in an optical reading device such as a copying machine because of a flare, that is, because white does not extend to the whole area but is influenced by black at the periphery, for example. To address this phenomenon, the following correction is performed.

For example, assuming that the matrix of the white region is 3×3, the following relation is satisfied.

$((a_{00}<thw)$ and $(a_{01}<thw)$ and $(a_{02}<thw)$
and $(a_{10}<thw)$ and $(a_{11}<thw)$ and $(a_{02}<thw)$
and $(a_{20}<thw)$ and $(a_{21}<thw)$ and $(a_{22}<thw))$ This is nominated as a candidate for a correction white region, the correction white region is calculated using the Laplacian described above. Here, thw is a value closer to black than the thick line, and N is caused to be smaller than the value of the white region for a thick line described above. N is caused to be small so as to extract stable data in which a change amount of the white data is small. A result of the extracted correction white region is corrected to the white region for a thick line described above to be a correction white region for a thick line. That is, either of the correction white region and the white region for a thick line becomes the correction white region for a thick line. Also here, the small dots on the highlight side on the pattern or the parallel line tint pattern are removed so as not to be extracted.

Next, the black region is detected to obtain extraction data of a line drawing on the black region. The following describes an operation of detecting the black region using a symbolized matrix in FIG. 4. For example, assuming that the matrix of the black region is 3×3, the following relation is satisfied.

$((a_{00}<thb)$ and $(a_{01}<thb)$ and $(a_{02}<thb)$
and $(a_{10}<thb)$ and $(a_{11}<thb)$ and $(a_{02}<thb))$
or $((a_{10}<thb)$ and $(a_{11}<thb)$ and $(a_{12}<thb)$
and $(a_{20}<thb)$ and $(a_{21}<thb)$ and $(a_{22}<thb))$
or $((a_{11}<thb)$ and $(a_{10}<thb)$ and $(a_{20}<thb)$
and $(a_{01}<thb)$ and $(a_{11}<thb)$ and $(a_{11}<thb))$
or $((a_{01}<thb)$ and $(a_{11}<thb)$ and $(a_{21}<thb)$
and $(a_{02}<thb)$ and $(a_{12}<thb)$ and $(a_{22}<thb))$ When the peripheral data including the target pixel is smaller than a threshold thb, it is nominated as a candidate for the black region. As the candidate for the black region, a typical black value, in other words, density to emphasize a character is set. Although this pattern exemplifies an orthogonal pattern, an oblique pattern and the like may be added.

To calculate the black region from the candidate for the black region, the Laplacian is obtained as follows.

$$x=(a_{22}\times 2)-(a_{21}+a_{23})\times i$$

$$x=((a_{22}\times 4)-(a_{11}+a_n+a_n+a_{33}))\times i/2+x$$

$$x=(a_{22}\times 2)-(a_{12}+a_{32})+x$$

Here, i is the weighting factor for correcting the difference in MTF between main scanning and sub-scanning or performing correction in scaling, and may be represented by a similar expression in extracting the white region described above.

When the value of x is in a range of a certain value "N", it is determined as the black region. The following expression is established.

$$-N<x<N$$

This result is determined as indicating the black region. Due to this, the dots on a shadow side on the pattern or the parallel line tint pattern are removed so as not to be extracted.

Edge amount extraction is represented by the following expression.

$$x=(a_{22}\times 2)-(a_{21}+a_{23})\times i$$

$$x=((a_{22}\times 4)-(a_{11}+a_{13}+a_{31}+a_{33}))\times i/2+x$$

$$x=(a_{22}\times 2)-(a_{12}+a_{32})+x$$

Here, i is a selective coefficient such as 1, 1.115, 1.25, 1.375, 1.5, 1.625, 1.175, 1.875, and 2 so that a gate scale is reduced in designing hardware. These coefficients are obtained using fixed-point arithmetic. In this way, the MTF of main scanning and sub-scanning is corrected, that is, blurring in an optical system, a traveling system, and the like is corrected.

Typically, the MTF is different between the main scanning and the sub-scanning. The scaling in the sub-scanning is performed by varying a reading area of the reading device, in other words, a speed thereof, so that the MTF varies depending on a scaling factor in the sub-scanning. However, in this example, the scaling in the main scanning, that is, the scaling unit 207 is arranged after the original recognizing unit 202 as illustrated in FIG. 2, so that there is no problem. The matrix is selectable so that the edge amount is obtained as follows when a magnification in the sub-scanning is large, for example, 200%.

$$x=(a_{22}\times 2)-(a_{11}+a_{23})\times i$$

$$x=((a_{22}\times 4)-(a_{11}+a_{13}+a_n+a_{33}))\times i/2+x$$

$$x=(a_{22}\times 2)-(a_{11}+a_{32})+x$$

In this way, scaling processing in the sub-scanning is addressed. As described above, the Laplacian unit 304 outputs a white region signal, a black region signal, and the edge amount. The white region signal for a thick line and a thin line indicates the white region with L, and the black region signal indicates the black region with H.

FIG. 5 is a cross-sectional view of the line drawing, and a conceptual diagram indicating a relation among the white region, the black region, and the threshold. In the drawing, THB represents a threshold of the black region, Thw1 represents a threshold for a thin line of the white region, Thw2 represents a threshold for a thick line of the white region, and Thw3 represents a threshold for correction of the white region. FIG. 6 is an explanatory diagram illustrating a relation of an edge amount [x].

Next, the following describes operations of the pattern matching units 305A and 305B. The pattern matching unit 305A extracts the white region around the black region. It is defined here that a white region pattern [W] corresponds to a signal of the white region for a correction thick line, and a black pattern [K] corresponds to the black region signal. A pattern example is [7×7] as follows.

(k12 AND k13 AND k14 AND k12 AND k23 AND k24 AND k32 AND k33 AND k34 AND
((w52 AND w53 AND w54) or (w62 AND w63 AND w64) or (w12 AND w13 AND w14) or (w02 AND w03 AND w04))
or (k21 AND k31 AND k41 AND k22 AND k32 AND k42 AND k23 AND k33 AND k44 AND
((w25 AND w35 AND w45) or (w26 AND w36 AND w46) or (w21 AND w31 AND w41) or (w20 AND w30 AND w40)))

Although the above example is illustrated with a horizontal component and a vertical component, a pattern of an oblique component is similarly extracted. The white region on the black region is extracted in this manner. The line drawing of the black region can be extracted without erroneously recognizing the dots as the line drawing because there are many black regions.

The black region, the white region for correcting a thick line, and the thin line white region may be encoded utilizing a large/small relation thereof. The following describes an example of encoding assuming that the black region is B, the white region for correcting a thick line is W1, and the thin line white region is W2. In this case, 3 bit×n line is obtained when the encoding is not performed. When the encoding is performed as follows, 2 bit×n line is obtained.

In a case of B→code "1"
In a case of W2→code "2"
In a case of W1 and not W2→code "3"
Other than B, W1, and W2→code "0"

The code ranges from "0" to "3", so that it can be represented by 2-bit. Reverse processing may be performed to expand the code. The large/small relation is not necessarily fixed, and can be preferably reversed.

Figure 7:
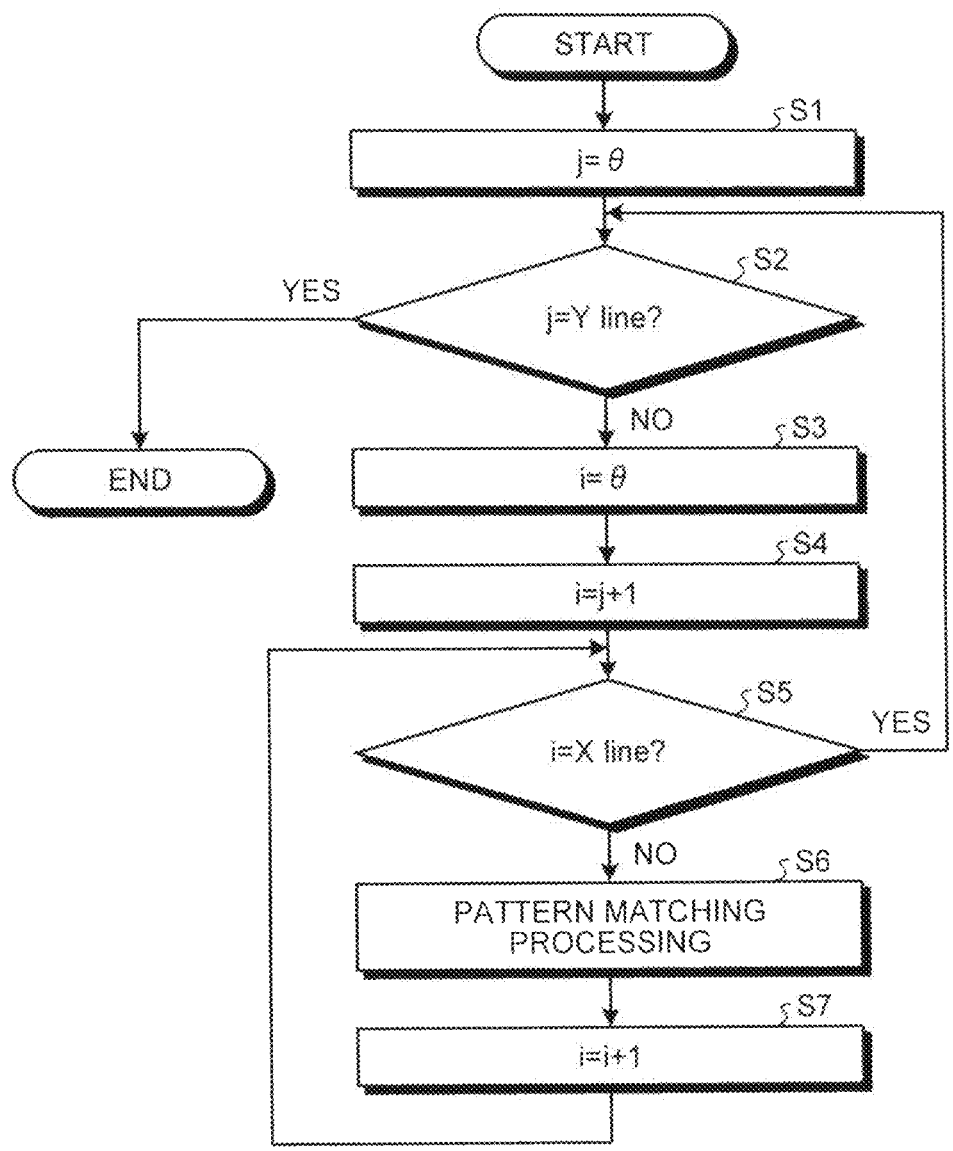
FIG. 7 is a flowchart illustrating a pattern matching processing procedure according to the embodiment of the present invention.
Figure 8:
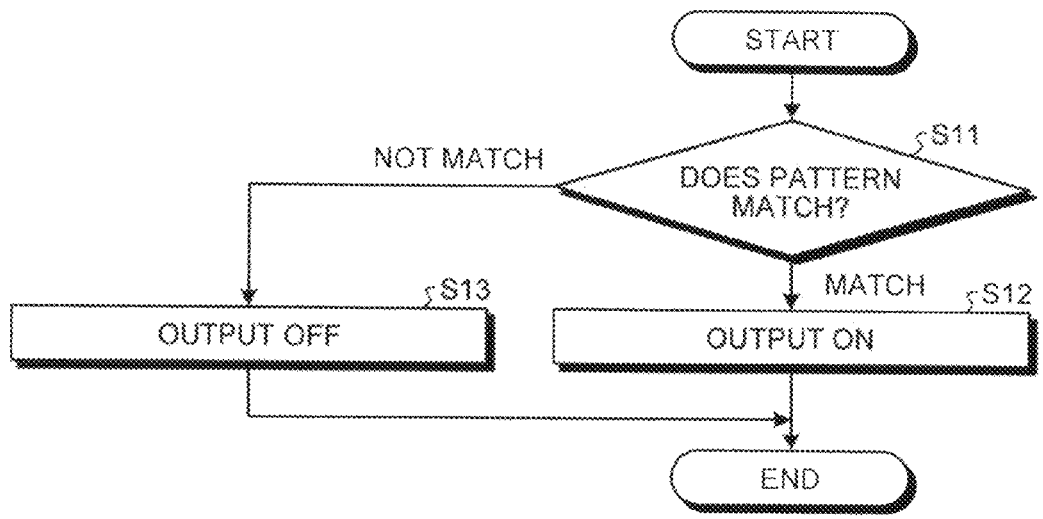
FIG. 8 is a flowchart illustrating a processing procedure in a pattern matching unit according to the embodiment of the present invention.
Figure 9:
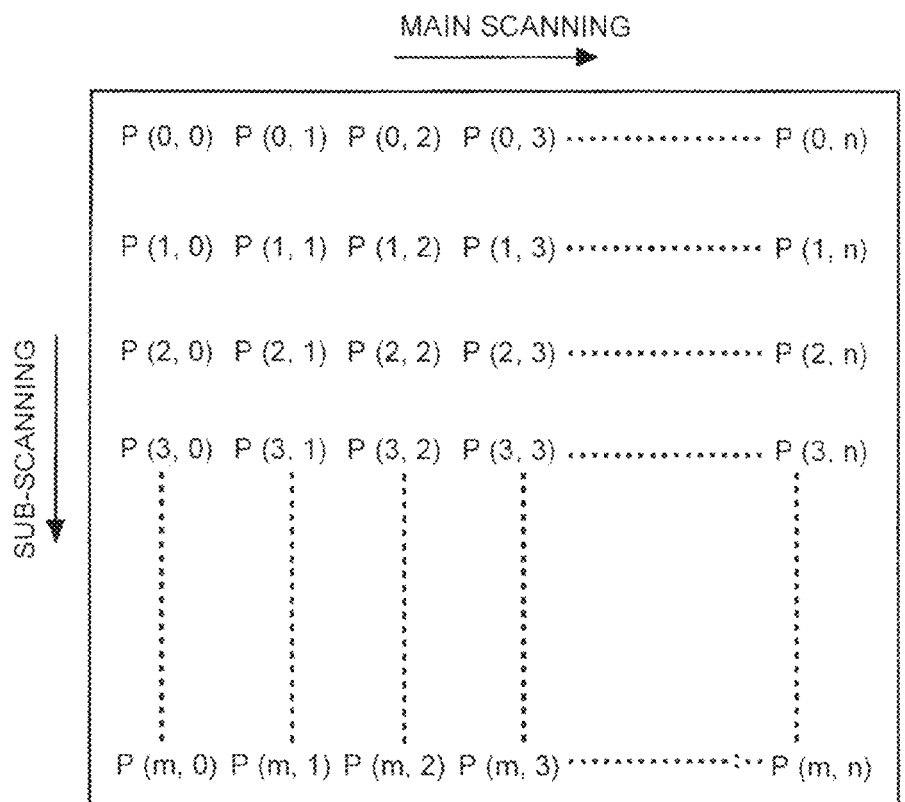
FIG. 9 is a schematic diagram for explaining a target pixel setting in pattern matching processing according to the embodiment of the present invention.

The processing procedure is as illustrated in the flowcharts of FIG. 7 and FIG. 8. When the target pixel is set as illustrated in FIG. 9 described below, the processing is performed in the main-scanning direction to be finished as illustrated in FIG. 7. The target pixel is incremented by 1 in the sub-scanning direction, and the processing is performed in the main-scanning direction again.

The following describes pattern matching processing with reference to the flowchart in FIG. 8. Pattern matching is performed to determine whether a pattern matches the pattern described above (Step S11). An output PM1 outputs H[on] if they match each other (Step S12), and the output PM1 outputs L[off] if they do not match each other (S13).

The pattern matching unit 305A extracts an edge of a thick-line portion of the line drawing through the above processing.

The pattern matching unit 305B detects a thin line. The thin line means a character and a line drawing having a line width of 1 mm or less. The black pattern [k] is H when the black region or the edge amount is larger than a threshold THRB. The white pattern [w] is H when the white region for a thin line or the edge amount is smaller than a threshold THRW [an absolute value thereof is large because it is a negative component]. A magnification, and a type of the original such as color, monochrome, printed photograph, a photographic paper photograph, a copy original, and a map may be changed with an adjustment key and the like. That is, the correction is performed with the edge amount component so as to enhance contrast of the thin line.

A pattern example of the thin line is [7×7] as follows.
((w22 AND w23 AND w24) or (w02 AND w03 AND w04)
  AND w12 AND w13 AND w14
  AND k32 AND k33 AND k34
  AND w52 AND w53 AND w54
  AND (w42 AND w43 AND w44) or (w62 AND w63 AND w64)) or
((w22 AND w32 AND w42) or (w20 AND w30 AND w40)
  AND w21 AND w31 AND w41
  AND k23 AND k33 AND k43
  AND w25 AND w35 AND w45
  AND (w24 AND w34 AND w44) or (w26 AND w36 AND w46)) or
((w12 AND w13 AND w14) or (w02 AND w03 AND w04)
  AND w32 AND w33 AND w34
  AND ((k22 AND k23 AND k24) or (k42 AND k43 AND k44))
  AND (w52 AND w53 AND w54) or (w62 AND w63 AND w64)) or
((w21 AND w31 AND w41) or (w20 AND w30 AND w40)
  AND w23 AND w33 AND w43
  AND ((k22 AND k32 AND k42) or (k24 AND k34 AND k44))
  AND (w25 AND w35 AND w45) or (w26 AND w36 AND w46))

Although the above example is illustrated with the horizontal component and the vertical component, a pattern of the oblique component is similarly extracted. In this way, the black pattern sandwiched from both sides with the white patterns is extracted as a candidate for the thin line.

Figure 10:
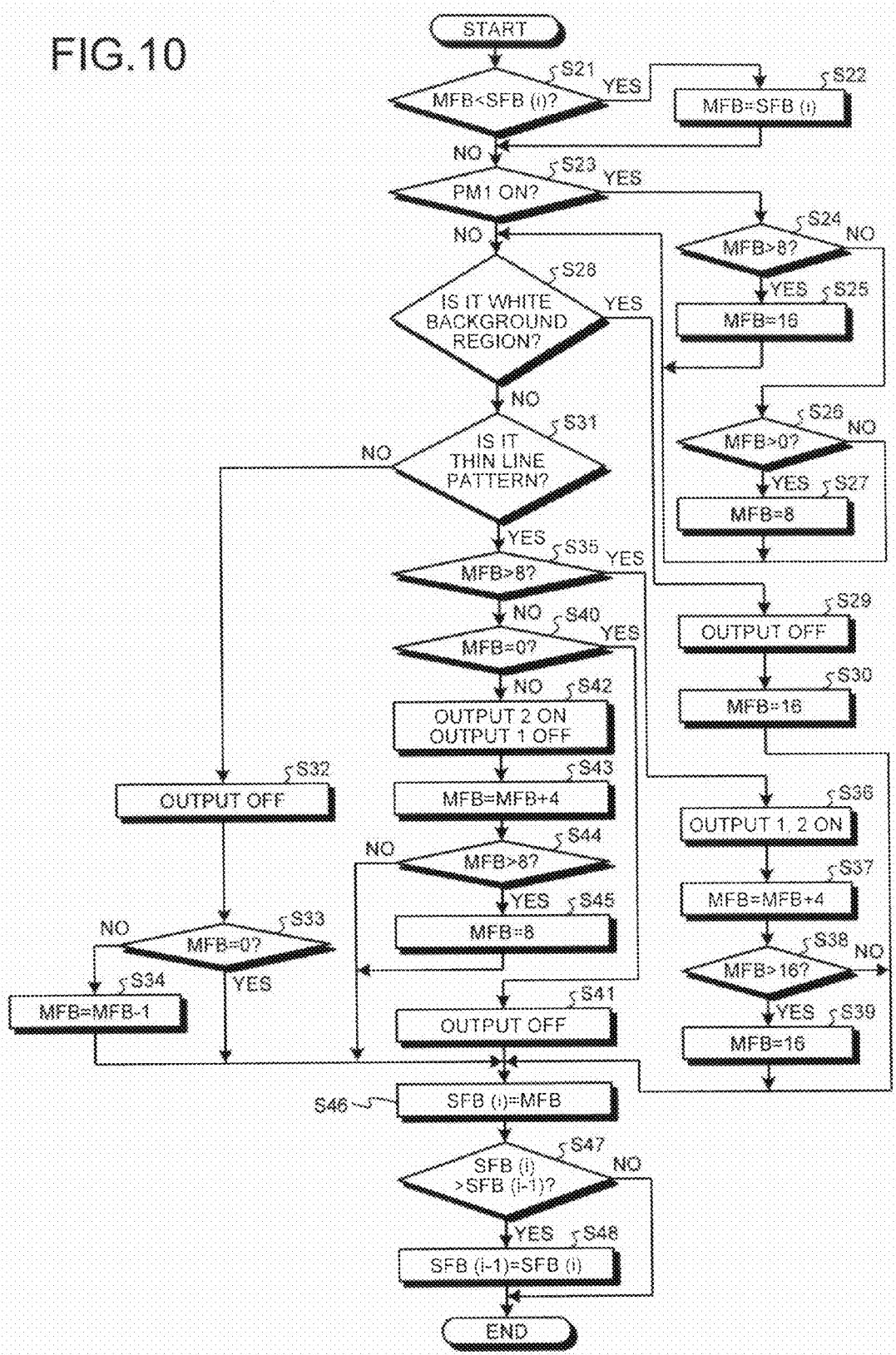
FIG. 10 is a flowchart illustrating a pattern matching processing procedure in the pattern matching unit according to the embodiment of the present invention.

The processing procedure is as illustrated in the flowcharts of FIG. 7 and FIG. 10. When the target pixel is set as illustrated in FIG. 9, the processing is performed in the main-scanning direction to be finished as illustrated in FIG. 7. The target pixel is incremented by 1 in the sub-scanning direction, and the processing is performed in the main-scanning direction again.

Next, the following describes the pattern matching processing in the pattern matching unit 305B according to the embodiment with reference to FIG. 10. Here, MFB is a state variable and is 0 at a distal end of the main scanning. SFB[i] is an arrangement corresponding to one line in the main-scanning direction, and is a state variable of a previous line.

First, the current state variable MFB is compared with the state variable SFB[i] of the previous line (Step S21). If MFB<SFB[i] (Yes at Step S21), MFB=SFB[i] is executed and the process proceeds to Step S22 (Step S22). If not (No at Step S21), the process proceeds to Step S23.

At Step S23, it is determined whether the output PM1 from the pattern matching unit 305A is on (Step S23). If the output PM1 is not on, that is, off (No at Step S23), the process proceeds to Step S28. On the other hand, if the output PM1 is on (Yes at Step S23), a value of the MFB is changed when the value is larger than 0 at Step S24 to Step S27. Specifically, when the MFB is larger than 8, the MFB is set to 16 (Step S24 and Step S25). When the MFB is larger than 0 and smaller than 8, the MFB is set to 8.

At Step S28, it is determined whether the data is the white background region. The white background region here is determined when the following relation is obtained assuming that the white region for a thin line of the output from the Laplacian unit 304 is a.
$a_{00}$ AND $a_{01}$ AND $a_{02}$
AND $a_{10}$ AND $a_{11}$ AND $a_{12}$
AND $a_{20}$ AND $a_{21}$ AND $a_{11}$ If it is determined that the data is the white background region at Step S28 (Yes at Step S28), L[off] is output to an output 1 and an output 2 of the pattern matching unit 305B (Step S29), MFB=16 is set (Step S20), and the process proceeds to Step S46.

On the other hand, if it is determined that the data is not the white background region (No at Step S28), it is determined whether the data matches a thin line pattern described above to determine whether the data is the thin line pattern (Step S31). If the data is not the thin line pattern (No at Step S31), L[off] is output to the output 1 and the output 2 of the pattern matching unit 305B (Step S32) to determine whether MFB=0 is satisfied (Step S33). If MFB=0 is satisfied (Yes at Step S33), the process proceeds to Step S36. If MFB=0 is not satisfied (No at Step S33), MFB=MFB−1 is set (Step S34), and the process proceeds to Step S46.

If it is determined that the data is the thin line pattern at Step S31 (Yes at Step S31), it is determined whether MFB>8 is satisfied (Step S35). If MFB>8 is satisfied (Yes at Step S35), H[on] is output to the output 1 and the output 2 of the pattern matching unit 305B (Step S36). In addition, MFB=MFB+4 is set at Step S37. If MFB>16 is satisfied at Step S38 (Yes at Step S38), MFB=16 is set (Step S39). If MFB>16 is not satisfied (No at Step S38), the process proceeds to Step S46.

If the MFB is not larger than 8 at Step S35 (No at Step S35), it is determined whether MFB=0 is satisfied (Step S40). If MFB=0 is satisfied (Yes at Step S40), L[off] is output to the output 1 and the output 2 of the pattern matching unit 305B (Step S41), and the process proceeds to Step S46. If MFB=0 is not satisfied (No at Step S40), L[off] is output to the output 1 of the pattern matching unit 305B, and H[on] is output to the output 2 (Step S42). Thereafter, MFB=MFB+4 is set (Step S43). However, if the MFB is equal to or larger than 16, the MFB is set to 16. If MFB>8 is satisfied at Step S44 (Yes at Step S44), MFB=8 is set. If MFB>8 is not satisfied (No at Step S44), the process proceeds to Step S46.

At Step S46, SFB[i]=MFB is set, and the state variable SFB[i] of the previous line is updated. Next, it is determined whether SFB[i]>SFB[i−1] is satisfied at Step S47. This is a comparison between the updated data of the previous line and the updated data of the previous line and the previous pixel. If the data SFB[i] of the previous line is larger, SFB[i−1]=SFB[i] is set (Step S48) and the process is finished.

The above processing is sequentially performed in the main-scanning direction. That is, the state variable MFB is sequentially propagated in a direction of an arrow 3 in FIG. 11. The state variable MFB is then propagated in a direction of an arrow 1 at Step S46, and propagated in a direction of an arrow 2 at Step S47. Accordingly, the state variable is set in the determination of the white background region at Step S28 or in the pattern matching at Step S22, so that an extremely thin line on the white background can be detected and dots on the pattern are prevented from being erroneously extracted. The state variable is reset by matching of the thin line pattern at Step S24, so that a group of characters can be favorably extracted.

The output 1 and the output 2 of the pattern matching unit 305B are caused to be different from each other depending on the state variable, so that a character on the white background and a character on the dots can be separately output.

Figure 11:
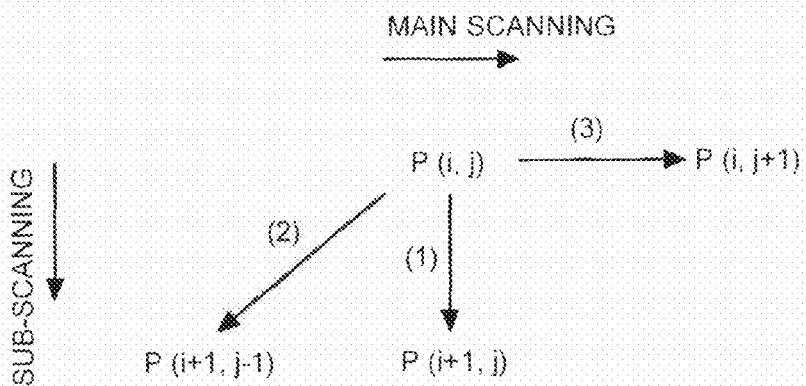
FIG. 11 is a schematic diagram illustrating propagation of a state variable MFB in the pattern matching processing according to the embodiment of the present invention.

As is clear from FIG. 11, an arrow direction in the sub-scanning is 0 or + (positive) direction, so that it is sufficient that processing performed by a line unit, that is, performed for each line of the main scanning includes the state variable for one line and a memory of the number of lines required for pattern matching. The processing can be easily performed without a page memory and the like.

Figure 12:
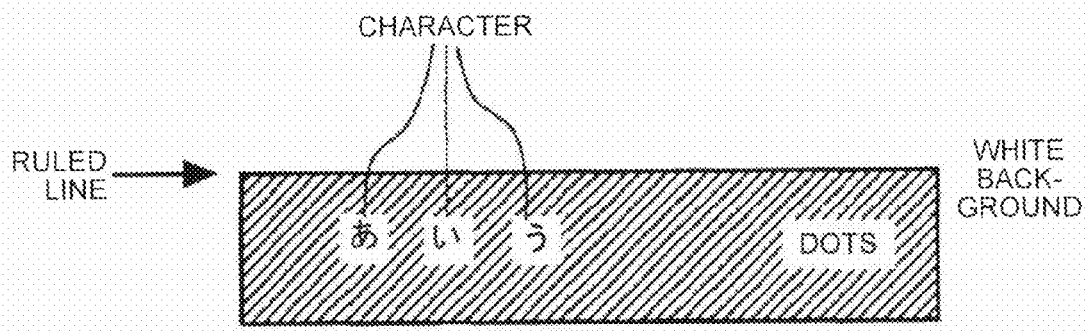
FIG. 12 is a schematic diagram illustrating an example of determining a thin line based on a difference in the state variable in the pattern matching unit of the line-drawing recognizing unit according to the embodiment of the present invention.

As illustrated in FIG. 2, the pattern matching unit 305B outputs the output 1 to the isolated point removal unit 306A and outputs the output 2 to the isolated point removal unit 306B. The output 1 is different from the output 2 in the state variable. Accordingly, for example, as illustrated in FIG. 12, when characters [あ, い, う, and/or the like] are described inside a frame constituted by a ruled line and the inside of the frame is filled with dots, both of the output 1 and the output 2 determine the frame constituted by the ruled line as a thin line, and the characters on the dots can be determined as the thin line only by the output 2 having a large state variable.

Next, the following describes the isolated point removal units 306A and 306B. Both of the isolated point removal units 306A and 306B are constituted by the same circuit. Input data to the isolated point removal unit 306A includes the output [PM1] from the pattern matching unit 305A and the output [output 1] from the pattern matching unit 305B. Input data to the isolated point removal unit 306B includes the output [PM1] from the pattern matching unit 305A and the output [output 2] from the pattern matching unit 305B. The line drawing is constituted by a continuous line, so that the isolated point removal units 306A and 306B remove an isolated point. The isolated point is generated when the dots are erroneously detected as the line drawing.

When any one of the pattern matching unit 305A and the pattern matching unit 305B is an extraction pattern, it is used as the extraction pattern. For example, when the extraction pattern is equal to or larger than 2 in the pattern matching of 4×4, center pixels ($a_{22}$ and $a_{33}$ may be used) are corrected as the extraction pattern to output an output H (hereinafter, referred to as the "extraction pattern"). Due to this, the isolated point is removed and, at the same time, expanded (extended). As illustrated in FIG. 3, outputs from the isolated point removal units 306A and 306B are PM2 and PM3, respectively.

Next, the following describes the pixel density conversion units 307A and 307B. Both of the pixel density conversion units 307A and 307B include the same logic (circuit). Although the processing has been performed for each image so far, data in pixel units is converted into data in block units to perform processing in block units [4×4]. Here, although the data is simply thinned out to be 4×4, the isolated point removal units 306A and 306B substantially expand the data to be 4×4, so that missing data does not occur.

Next, the following describes the page memories 308A and 308B, and the page memory 313. Circuits of the page memories 308A, 308B, and 313 have the same function. An output result from the pixel density conversion unit 307A is input to the page memory 308A, an output result from the pixel density conversion unit 307B is input to the page memory 308B, and an output result from the color determination circuit 312 is input to the page memory 313.

The page memories 308A, 308B, and 313 include 1200 dots in the main-scanning direction×1736 lines in the sub-scanning direction [about 2 MB], and have a size larger than an A3 size and a DLT sheet [double-letter size] the resolution of which is 16 dots/mm in both of the main scanning direction and the sub-scanning direction.

In the first scanning, the input data is stored in the page memories 308A, 308B, and 313 in block [4×4 pixels] units, and is output via the selectors 309A, 309B, and 314 at the same time. In the second and subsequent scanning, a determination result stored in the page memories 308A, 308B, and 313 in the first scanning is output via the selectors 309A, 309B, and 314. That is, a color determination result and processing data of extracting the line drawing in the first scanning are used in the second and subsequent scanning, so that variation in the color determination result or an extraction result of the line drawing [C/P signal] between respective scanning processes can be eliminated.

Next, the following describes the isolated block removal units 310A and 310B. The isolated block removal units 310A and 310B include the same circuit having the same function. For example, when only a center block is on[H] and other blocks are off[L] in a matrix of 5×5 blocks, the center block is isolated, so that the output L is output as "off". "on" means the extraction pattern. In this way, the block isolated from the peripheral data is removed.

Next, the following describes the expansion units 311A and 311B. The expansion units 311A and 311B include the same circuit having the same function. Here, OR processing (expansion) of N×N is performed, and AND processing (contraction) of M×M is performed thereafter. Interpolation processing of 5×5 is then performed. An expansion amount is M−N.

A relation between M and N satisfies N>M. The OR processing is performed to connect the isolated block with an adjacent block or a peripheral block. The following is an example of expansion of 3×3 blocks (corresponding to 12×12 pixels).

$a_{00}$ or $a_{01}$ or $a_{02}$
or $a_{10}$ or $a_{11}$ or $a_{12}$
or $a_{20}$ or $a_{21}$ or $a_{11}$

The AND processing (contraction) of 5×5 pixels is performed thereafter. The following is an example thereof.

$a_{00}$ AND $a_{01}$ AND $a_{02}$ AND $a_{03}$ AND $a_{04}$
AND $a_{10}$ AND $a_{11}$ AND $a_{12}$ AND $a_{13}$ AND $a_{14}$
AND $a_{20}$ AND $a_{21}$ AND $a_{22}$ AND $a_{23}$ AND $a_{24}$
AND $a30$ AND $a_{31}$ AND $a_{32}$ AND $a_{33}$ AND $a_{34}$
AND $a_{40}$ AND $a_{41}$ AND $a_{42}$ AND $a_{43}$ AND $a_{44}$

Figure 13:
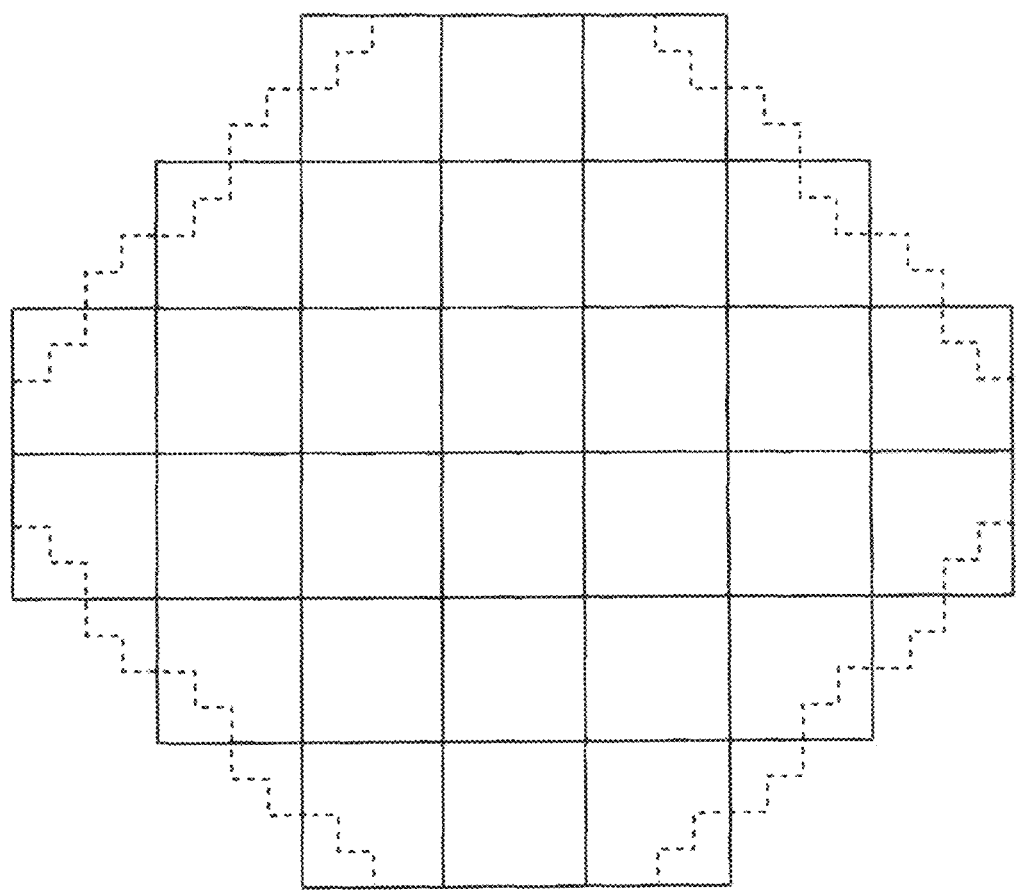
FIG. 13 is a schematic diagram illustrating an example of interpolation processing in an expansion unit in the line-drawing recognizing unit according to the embodiment of the present invention.

The interpolation processing is performed thereafter because jaggies at 100 dpi remain. FIG. 13 illustrates an example of the interpolation processing. In the drawing, a solid line represents the jaggies at 100 dpi before correction, and a dashed line represents an output after correction. For example, the following result is obtained in a matrix of 5×5. When the data extracting the line drawing satisfies the following logical expression, data of a target pixel $a_{22}$ is reflected (corrected).

(pattern 1 and ! pattern 2)
or (pattern 3 and ! pattern 4)

Details about the patterns 1, 2, 3, and 4 are as follows. Here, "!" represents an indefinite operator.

Pattern 1
($a_{00}$ and $a_{02}$ and ! $a_{04}$ and $a_{20}$ and $a_{22}$ and ! $a_{24}$ and ! $a_{40}$ and ! $a_{42}$ and ! $a_{44}$)
or (! $a_{00}$ and $a_{02}$ and $a_{04}$ and ! $a_{23}$ and $a_{22}$ and $a_{24}$ and ! $a_{40}$ and ! $a_{42}$ and ! $a_{44}$)
or (! $a_{00}$ and ! $a_{02}$ and ! $a_{04}$ and $a_{20}$ and $a_{22}$ and ! $a_{24}$ and $a_{40}$ and $a_{42}$ and ! $a_{44}$)
or (! $a_{00}$ and ! $a_{02}$ and ! $a_{04}$ and ! $a_{20}$ and $a_{22}$ and $a_{24}$ and ! $a_{40}$ and $a_{42}$ and $a_{44}$)

Pattern 2
($a_{11}$ and $a_{12}$ and $a_{13}$ and $a_{21}$ and $a_{22}$ and $a_{23}$ and $a_{31}$ and $a_{32}$ and $a_{33}$)

Pattern 3
(! $a_{00}$ and ! $a_{02}$ and $a_{04}$ and ! $a_{20}$ and ! $a_{22}$ and $a_{24}$ and $a_{40}$ and $a_{42}$ and $a_{44}$)
or ($a_{00}$ and ! $a_{02}$ and ! $a_{04}$ and $a_{20}$ and ! $a_{22}$ and ! $a_{24}$ and $a_{40}$ and $a_{42}$ and $a_{44}$)
or ($a_{00}$ and $a_{02}$ and $a_{04}$ and ! $a_{20}$ and ! $a_{22}$ and $a_{24}$ and ! $a_{40}$ and ! $a_{42}$ and $a_{44}$)
or ($a_{00}$ and $a_{02}$ and $a_{04}$ and $a_{20}$ and ! $a_{22}$ and ! $a_{24}$ and $a_{40}$ and ! $a_{42}$ and ! $a_{44}$)

Pattern 4
(! $a_{11}$ and ! $a_{12}$ and ! $a_{13}$ and ! $a_{21}$ and $a_{22}$ and ! $a_{23}$ and ! $a_{31}$ and ! $a_{32}$ and ! an)

By expanding the extraction pattern, intersection points and the like of the character are connected and the line drawing and the periphery thereof are subjected to line-drawing processing. Although a cross intersection point cannot be extracted in the pattern matching described above, the intersection points can be connected through this expansion processing. The line drawing and the periphery thereof are regarded as the line drawing to cause the black character processing to favorably affect the space filter.

Accordingly, even when there are dots in the frame of the ruled line such as a usable year/specification table of a catalog, the ruled line can be favorably extracted. The ruled line including the white background is extracted as a character, and a character on the dots is output as a determination result different from the character on the white background, so that the character on the white background and the character on the dots can be discriminated to be separately processed.

Another example of the pattern matching unit 305B of the line-drawing recognizing unit 301

Here, an output condition is changed in the pattern matching unit 305B of the line-drawing recognizing unit 301 illustrated in FIG. 3 described above. A basic configuration and operation are the same as those described above, so that the following describes different components.

In the thin line pattern matching performed by the pattern matching unit 305B described above, the output 1 and the output 2 are set depending on the state variable. In addition, a setting condition of the output 2 is added here to extract the character [ruled line] on the pattern.

Figure 14:
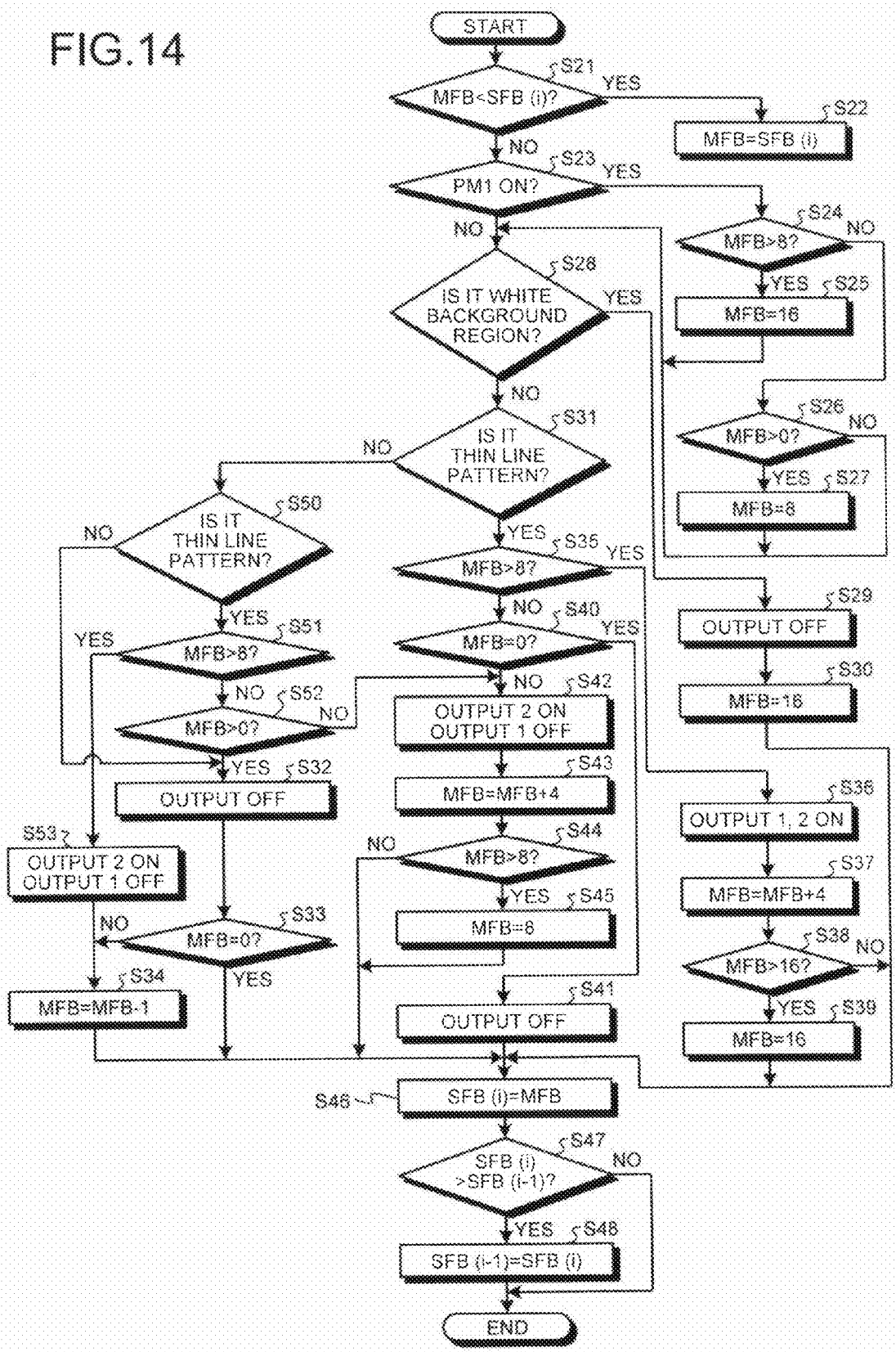
FIG. 14 is a flowchart illustrating a pattern matching processing procedure of a second pattern matching unit according to the embodiment of the present invention.

Next, the following describes a second pattern matching processing procedure according to the embodiment with reference to FIG. 14. The same reference numerals as those in the flowchart illustrated in FIG. 10 represent the common processing, so that the following describes different components.

It is determined whether the data is the thin line pattern described above at Step S31. If the data is not the thin line pattern (No at Step S31), it is determined whether the data matches a thin line pattern 1 described below (Step S50).

The thin line pattern 1 may, but not necessarily, be the same as the thin line pattern described above. The black pattern [k] is H when the black region or the edge amount is larger than the threshold THRB (refer to FIG. 6). The white pattern [w] is H when the white region for a thin line or the edge amount is smaller than the threshold THRW. That is, the correction is performed with the edge amount component so as to enhance contrast of the thin line. At least one of THRB and THRW is caused to be a value that can be extracted more easily than that in the thin line pattern matching. However, when the pattern in the pattern matching is different between the thin line pattern and the thin line pattern 1, an extraction result is caused be extracted more easily in the thin line pattern.

When the data does not match the thin line pattern 1 at Step S50 (No at Step S50), L[off] is output to the output 1 and the output 2 of the pattern matching unit 305B (Step S32) to determine whether MFB=0 is satisfied (Step S33). If MFB=0 is satisfied (Yes at Step S33), the process proceeds to Step S46. If MFB=0 is not satisfied (No at Step S33), MFB=MFB−1 is set (Step S34), and the process proceeds to Step S46.

On the other hand, if the data matches the thin line pattern 1 at Step S50 (Yes at Step S50), it is determined whether MFB>8 is satisfied (Step S51). If the state variable MFB is larger than 8 (Yes at Step S51), L[off] is output to the output 1 of the pattern matching unit 305B, and H[on] is output to the output 2 (Step S53). Thereafter, MFB=MFB−1 is set (Step S34), and the process proceeds to Step S46.

If the state variable MFB is not larger than 8 (No at Step S51), it is determined whether MFB=0 is satisfied (Step S52). If MFB=0 is not satisfied (No at Step S52), the process proceeds to Step S42. On the other hand, if MFB=0 is satisfied (Yes at Step S52), L[off] is output to the output 1 and the output 2 of the pattern matching unit 305B (Step S32), and it is determined again whether MFB=0 is satisfied (Step S33). If MFB=0 is satisfied (Yes at Step S33), the process proceeds to Step S46. If MFB=0 is not satisfied (No at Step S33), MFB=MFB−1 is set (Step S34), and the process proceeds to Step S46.

The thin line pattern matching, the thin line pattern matching 1, and the thresholds THRW and THRB may be encoded utilizing a large/small relation thereof. An example of encoding is as follows. Assuming that THRW and THRB of the thin line pattern are THRW and THRB, THRW and THRB of the thin line pattern 1 are THRW1 and THRB1, and the large/ small relation thereof is THRW<THRW1<THRB1=THRB. In this case, 4 or 3 bits×n lines is obtained without encoding, and 2 bits×n lines is obtained when the encoding is performed as follows.

P<THRW→code "0"
THRW<P<THRW1→code "1"
THRW1<P<THRB→code "2"
THRB<P→code "3"

P is the edge amount here. The code ranges from "0" to "3", so that it can be represented by 2-bit. Reverse processing may be performed to expand the code. The large/small relation is not necessarily fixed, and can be preferably reversed.

Due to this, the pattern on the white background can be switched with the pattern on the dots or a color background using the state variable [MFB], and the state variable can be used in common.

If the character on the dots can be favorably extracted, it is not necessary to refer to the state variable to extract the character on the dots at S40 in the flowchart of FIG. 14. That is, it is always determined that they match each other at S42. The character on the dots and the character on the white background may be separated in this manner.

Accordingly, even when there are dots in the frame of the ruled line such as an instruction manual/specification table of a catalog, the ruled line can be favorably extracted. The ruled line including the white background is extracted as a character, and determination different from that on the character on the white background is performed on the character on the dots, so that accuracy is more improved than the first embodiment. The character on the white background and the character on the dots can be discriminated to be separately processed.

FIG. 11 illustrates only three propagation directions of P(i, J+1), P(i+1, J), P(i+1, J−1). However, −2, −3, and the like should be added, not only −1, to the direction of P(i+1, J−1) to eliminate a property of main-scanning direction from the propagation direction of the state variable.

In a device in which all pieces of the image data are stored in the page memory, the propagation direction of the state variable may be set to all directions (360 degrees).

Figure 15:
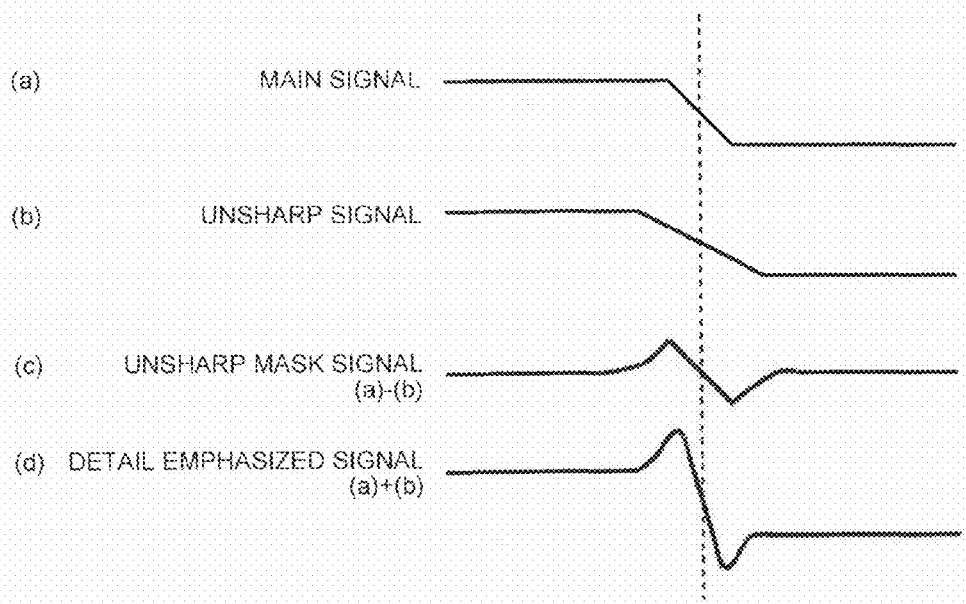
FIG. 15 is a schematic diagram illustrating a detail emphasizing effect of unsharp masking according to the embodiment of the present invention.

Next, the following describes a detail emphasizing effect caused by unsharp masking according to the embodiment with reference to FIG. 15. In FIG. 15, (a) represents a main signal of a processing target, (b) represents an unsharp signal, (c) represents an unsharp mask signal, and (d) represents a detail emphasized signal. In the embodiment, correction is performed based on an example of edge characteristics thereof. In the embodiment, the Laplacian unit 304 corrects the edge amount using the unsharp mask signal of (c). Alternatively, the correction may be performed using the detail emphasized signal of (d) or other signals.

When the pattern matching unit 305A picks up black [outline] on the white background, a character on the dots (hatched area) is not extracted. The pattern matching unit 305B separately extracts the ruled line on the white background and the ruled line on the dots or the color background.

For example, a complicated character such as "書" is also extracted by the pattern matching unit 305B.

In the example described above, although the upper limit value of the state variable is 8 [a character on the dots] or 16 [a character on the white background], any other value can be used.

A method for separating the character on the dots and the character on the white background is used to prevent the character in the hatched area in the frame of the ruled line from being erroneously detected. There is a possibility that the character is close when the ruled line is thin, and the possibility that the character is close is reduced as the width of the ruled line increases.

According to the example described above, it is possible to separately extract a small character, a line drawing, a character having a large stroke count on the white background, and a character on the dots. A reflective direction of the sub-scanning direction is one-way, so that it is a reading method of raster scan system, and is specifically suitable for hardware conversion and can be easily reflected in image data.

The image processing device according to the embodiment has an algorithm for detecting the edge of the line drawing, and does not specifically detect and remove dots specific to printed matter. Accordingly, the image processing device is specifically effective for an original not including dots, such as a generation [a copy by a copying machine].

Slight erroneous determination of the region is removed from the extracted pattern by removing the isolated point in pixel units, and thereafter the isolated block is removed in a wide range in a large block units [4×4], so that the erroneous determination can be favorably removed. A coarse pixel density in block units is converted into an original pixel density, so that the coarse pixels in block units disappear.

When the expansion units 311A and 311B simply perform expansion, an isolated region is merely enlarged. However, expansion is performed by M pixels and thereafter contraction is performed by N pixels where X=M−N is satisfied assuming that an expansion amount is X as in this embodiment, and accordingly, X<M is satisfied, so that the isolated regions can be connected with each other. The expansion is performed with coarse density, in other words, the expansion is performed while maintaining the coarse density [in block units], so that an amount of hardware can be reduced.

The result from the first scanning is also used in the second and subsequent scanning, so that a line drawing determination result does not necessarily match the color determination result. Accordingly, the processing can be performed without variations. The data stored in the memory is not a final result, but the data processing density of which is coarse (caused to be coarse) in data processing, so that a data amount stored in the memory can be reduced.

Instead of storing both of the line drawing determination result and the color determination result in the page memories 308A, 308B, and 313, for example, only the line drawing determination result may be stored and the color determination result for each scanning may be used. Accordingly, a memory capacity is 2 MB×2=4 MB, so that the configuration can be easily made using a 4 MB memory that is commercially available.

When the page memory 308A is 2 MB, the page memories 308B and 131 are 8×4 blocks, not 4×4 blocks, and each memory capacity of the page memories 308B and 131 is 1 MB, the entire memory capacity can be 4 MB [2 MB×2+1 MB]. Instead of storing all of the determination results in the memory, only a result having large variations for each scanning may be stored in the memory.

Another embodiment of the color determining unit 302

Figure 16:
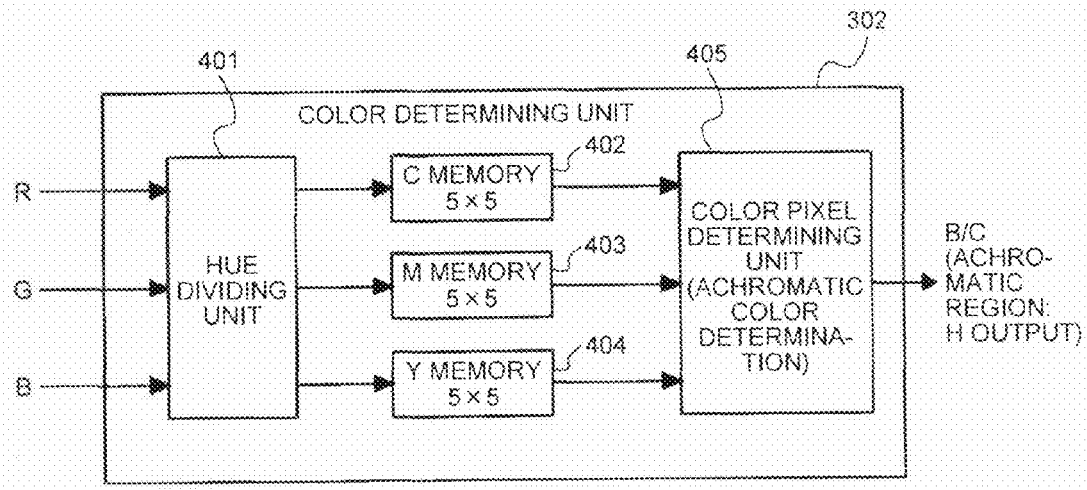
FIG. 16 is a block diagram illustrating a configuration of a color determining unit according to the embodiment of the present invention.

Next, the following describes a configuration of the color determining unit 302 according to the embodiment with reference to FIG. 16. The color determining unit 302 includes a hue dividing unit 401, line memories 402 to 404, and a color pixel determining unit 405.

The hue dividing unit 401 is a hue dividing module that is configured and operated as described below. The line memories 402 to 404 store 5 lines of outputs c, m, and γ from the hue dividing unit 401. The color pixel determining unit 405 is configured as illustrated in FIG. 17 described below, and has a function of achromatic pixel determining module that determines whether the input image data is a black pixel or a color pixel.

Figure 17:
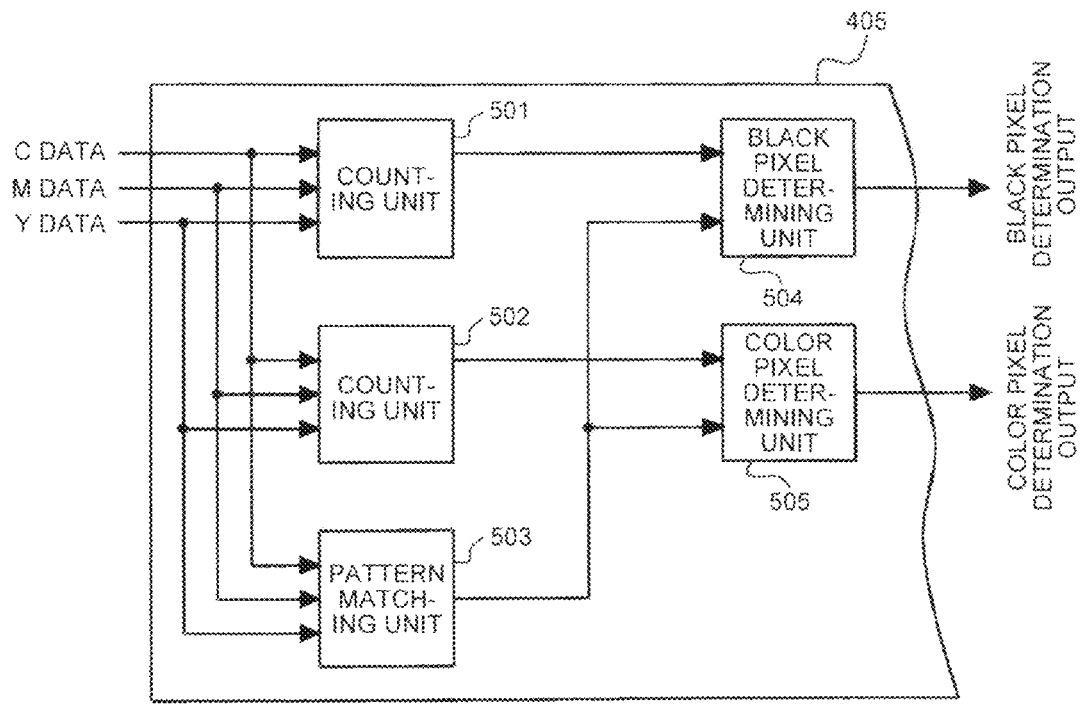
FIG. 17 is a block diagram illustrating an internal structure of a color pixel determining unit according to the embodiment of the present invention.
Figure 18:
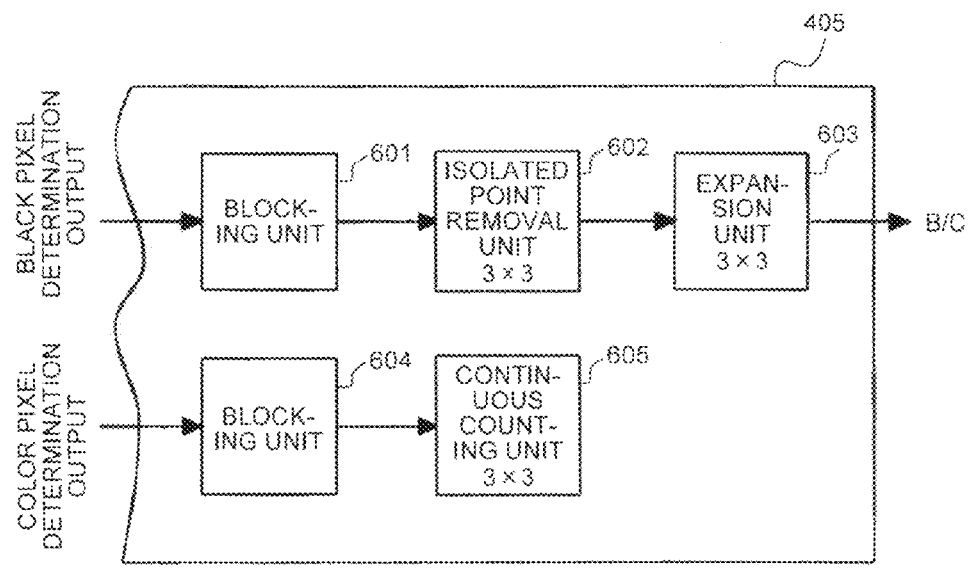
FIG. 18 is a block diagram illustrating the internal structure of the color pixel determining unit according to the embodiment of the present invention.
Figure 19A:
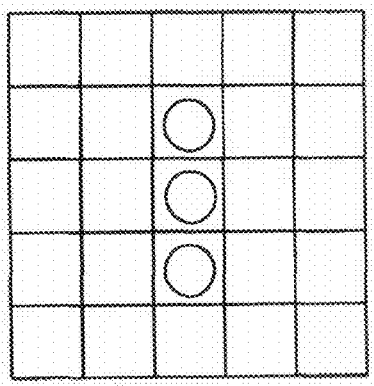
FIGS. 19A to 19D are schematic diagrams for explaining examples of patterns used in pattern matching according to the embodiment of the present invention.
Figure 19B:
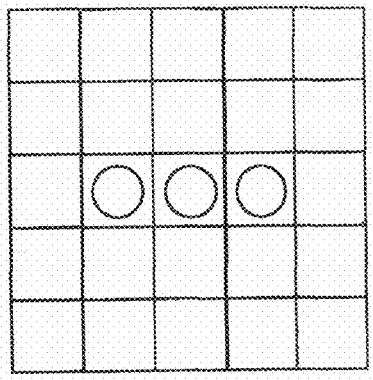
Figure 19C:
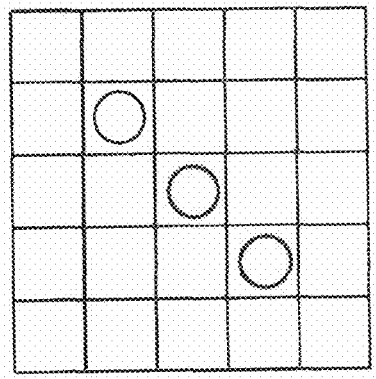
Figure 19D:
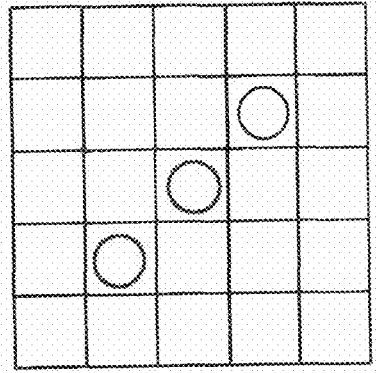

Next, the following describes an internal structure of the color pixel determining unit 405 according to the embodiment with reference to FIG. 17 and FIG. 18. As illustrated in FIG. 17, the color pixel determining unit 405 includes a counting unit 501 and a counting unit 502, a pattern matching unit 503, a black pixel determining unit 504, and a color pixel determining unit 505.

The counting unit 501 and the counting unit 502 independently count planes of c, m, and y. The pattern matching unit 503 performs predetermined pattern matching described later on a pixel other than a pixel in which all of c, m, and y are 1 or 0, that is, a color pixel in 5×5 pixels determined by the hue dividing unit 401. The black pixel determining unit 504 determines the black pixel based on the output from the counting unit 501. The color pixel determining unit 505 determines the color pixel based on the outputs from the counting unit 502 and the pattern matching unit 503.

As illustrated in FIG. 18, the color pixel determining unit 505 includes a blocking unit 601, an isolated point removal unit 602, expansion unit 603, a blocking unit 604, and a continuous counting unit 605.

An output value from the black pixel determining unit 504 is input to the blocking unit 601 to be blocked. The isolated point removal unit 602 removes the data blocked by the blocking unit 601 as an isolated point when there is no black pixel block in a pixel adjacent to the target pixel. The expansion unit 603 performs expansion processing on 3 block pixels when there is a color pixel block in the output from the isolated point removal unit 602. An output value from the color pixel determining unit 505 is input to the blocking unit 604 to be blocked. The continuous counting unit 605 detects continuity of the color pixel blocks, and determines whether the original is a color original or a black-and-white original.

Next, the following describes an operation of the color determining unit 302 configured as described above. First, the hue dividing unit 401 divides color into signals of R, G, B, C, M, Y, Bk, and W. As an example of color division, each boundary between respective colors is obtained, and a difference between the maximum value and the minimum value of RGB is defined as an RGB difference to satisfy the following relations. In this example, the RGB data is blackened as the number increases.

(1) R-Y hue region boundary (ry)
when R−2*G+B>0, ry=1
if not, ry=0
(2) Y-G hue region boundary (rg)
when 11*R×8*G−3*B>0, rg=1
if not, yg=0
(3) G-C hue region boundary (gc)
when 1*R×5*G+4*B<0, gc=1
if not, gc=0
(4) C-B hue region boundary (cb)
when 8*R×14*G+6*B<0, cb=1
if not, cb=0
(5) B-M hue region boundary (bm)
when 9*R×2*G−7*B<0, bm=1
if not, bm=0
(6) M-R hue region boundary (mr)
when R+5*G×6*B<0, mr=1
if not, mr=0
(7) W pixel determination
when (R<thwr) && (g<thwg) && (B<thwb), y=m=c=0.

(8) Y pixel determination
when (ry==1) && (yg==0) && (RGB difference>thy), y=1, and m=c=0.
(9) G pixel determination
when (rg==1) && (gc==0) && (RGB difference>thg), c=y=1, and m=0.
(10) C pixel determination
when (gc==1) && (cb==0) && (RGB difference>thc), c=1, and m=y=0.
(11) B pixel determination
when (cb==1) && (bm==0) && (RGB difference>thb), c=m=1, and y=0.
(12) M pixel determination
when (bm==1) && (mr==0) && (RGB difference>thm), m=1, and y=c=0.
(13) R pixel determination
when (mr==1) && (ry==0) && (RGB difference>thr), y=m=1, and c=0.
(14) Bk pixel determination
if not falling under the above conditions of (7) to (13), y=m=c=1.

Priority is given to a smaller number among (7) to (14) described above. thwr, thwg, thwb, thy, thm, thc, thr, thg, and thb are thresholds determined before copying [processing]. The RGB difference is a difference between the maximum value and the minimum value of each piece of RGB image data in one pixel.

As an output signal, 3 bits of c, m, and y are output. That is, c, m, y, r, g, b, and bk are represented by 3 bits. The threshold is changed for each hue, because a chromatic range is different for each hue region and thus the thresholds depending on the hue regions are determined. The hue division in this case is merely an example, and not limited thereto. It may be represented by other expressions.

Five lines of outputs c, m, and y from the hue dividing unit 401 are stored in each of the line memories 402 to 404, and input to the color pixel determining unit 405. The five lines of data of c, m, and y are input to the counting units 501 and 502, and the pattern matching unit 503.

The pattern matching unit 503 performs pattern matching on the pixel (color pixel) other than the pixel in which all of c, m, and y are 1 [c=m=y=1] or all of c, m, and y are 0 [c=m=y=0] in 5×5 of pixels [c, m, and y] determined by the hue dividing unit 401. That is, any of the following patterns is satisfied, the pixel is nominated as a candidate 2 for the color pixel.
(1) pattern 1
ary[y+1][x] && ary[y][x] && ary[y−1][x]
(2) pattern 2
ary[y][x+1] && ary[y][x] && ary[y][x−1]
(3) pattern 3
ary[y+1][x+1] && ary[y][x] && ary[y−1][x−1]
(4) pattern 4
ary[y+1] [x−1] && ary[y][x] && ary[y−1][x+1]

In the above case, the center pixels are x and y. This pattern example is illustrated in FIGS. 19A to 19D. As described above, the pattern matching unit 503 performs pattern matching so as not to pick up the isolated point and the like. In contrast, to detect color of a small area such as a dot, it may be determined depending on whether the pixels (color pixels) are other than those in which center pixels are 1 [c=m=y=1] or all of c, m, and y are 0 [c=m=y=0].

The counting unit 502 counts the number of 5×5 pixels [c, m, and y] determined as described above. If a difference between the maximum value and the minimum value of the counted c, m, and y is equal to or larger than thcnt and the minimum value of the counted c, m, and y is smaller than thmin, the pixel is determined as a candidate 1 for the color pixel. The above-described thcnt and thmin are thresholds set before copying [processing].

y, m, and c are developed on planes, the number thereof is counted for each plane in N×N matrix and it is assumed that the minimum value is black (Bk). Accordingly, if reading of the black pixel is shifted, it can be corrected. In addition, it is assumed that the difference between the maximum value and the minimum value indicates a chromatic pixel. Due to this, the pixel in which the reading of the black pixel is shifted is corrected and the chromatic pixel is extracted. That is, the pixel is determined as the chromatic pixel when there is the chromatic pixel of a predetermined pixel.

The color pixel determining unit 505 determines whether the outputs from the pattern matching unit 503 and the counting unit 502 are the color pixel. That is, when the outputs are the candidate 1 for the color pixel and the candidate 2 for the color pixel, the input data is determined as the color pixel.

Next, the output from the color pixel determining unit 505 is input to the blocking unit 604. This operation is performed similarly to the blocking unit 601, and the following processing is performed in a block unit of 4×4. The data blocked by the blocking unit 604 is then input to the continuous counting unit 605, for example.

The continuous counting unit 605 checks continuity of the color pixel blocks, and determines whether the original is a color original or a black-and-white original as follows.
OUT=[the number of blocks in which the chromatic pixel regions are continuous in the main-scanning direction≥RACS1]
[the number of blocks in which lines including the chromatic pixel regions are continuous in the sub-scanning direction≥RACS1]

The RACS1 is a threshold determined before copying (processing). The continuous counting unit 605 is configured such that the amount of hardware is small. In this case, the continuity is simply checked, so that there is substantially no problem if the determination condition is different between the main scanning and the sub-scanning.

The counting unit 501 counts the number of 5×5 pixels [c, m, and y] determined by the hue determining unit 401. That is, if a difference between the maximum value and the minimum value of the counted c, m, and y is equal to or smaller than thcnt and the minimum value of the counted c, m, and y is equal to or larger than thmin, the pixel is determined as the black pixel.

thcnt and thmin are thresholds determined before copying [processing]. In this case, y, m, and c are developed on planes, the number thereof is counted for each plane in N×N matrix, and it is assumed that the minimum value is black. Accordingly, if reading of the black pixel is shifted, it can be corrected.

It is assumed that the difference between the maximum value and the minimum value indicates the chromatic pixel. Due to this, the pixel in which the reading of the black pixel is shifted is corrected and the chromatic pixel is extracted. The pixel is determined as the chromatic pixel when there is the chromatic pixel of a predetermined pixel. thmin corrects pixels around the black pixel that may be colored due to the shift of reading.

The blocking unit 601 blocks an output of the black pixel determination by the black pixel determining unit 504. The blocking is such that, when there are color pixels of 2 pixels or more in a matrix of 4×4 pixels, the color pixels are output as the color pixel block. Processing subsequent to that of the blocking unit 601 is to output 4×4 pixels as one block.

Subsequently, the isolated point removal unit 602 removes the isolated point from the blocked data when there is no black pixel block in pixels adjacent to the target pixel. The expansion unit 603 performs expansion processing on 3 block pixels of the output from the isolated point removal unit 602 when there is a color pixel block. The expansion processing is performed so as to perform black character processing on the periphery of the black pixel. An output B/C signal outputs H for the black pixel block, and outputs L in other cases.

The counting units 501 and 502 suppress increase in an amount of memory due to the determination conditions for the chromatic [color] pixel/achromatic [black] pixel. Originally, it may be independent of the hue dividing unit 401. However, when the hue division is independently separated, memory for the pattern matching is unpreferably increased.

Although the embodiment described above has been implemented for the RGB data, it is not limited thereto. For example, hue determination is easily performed on a luminance color difference in Lab color space and the like.

Calibration Operation

Next, the following describes calibration (auto color calibration: hereinafter, referred to as "ACC") using a scanner reading value of a test pattern actually formed on a recording medium such as a recording sheet in the image processing device 1 according to the embodiment, with reference to FIG. 20.

The ACC function is such that the test pattern actually formed on the recording sheet is read by a scanner and an output γ conversion characteristic is adjusted. Accordingly, even when image output density of the image forming apparatus varies due to long-time use, the density can be corrected to appropriate output density as a target, and color reproducibility of the output image can be maintained. In the embodiment, the test pattern is output using a test pattern output module (not illustrated). The test pattern output module outputs a test pattern including at least an edge portion of a black region on the recording medium.

In a case of an ACC operation using a scanner reading value with a multi function peripheral (MFP), for example, conversion is not specifically performed in such as the CMYBk γ correction unit 209, and filter processing and color correction in the image processing unit 102 of FIG. 1.

Figure 20:
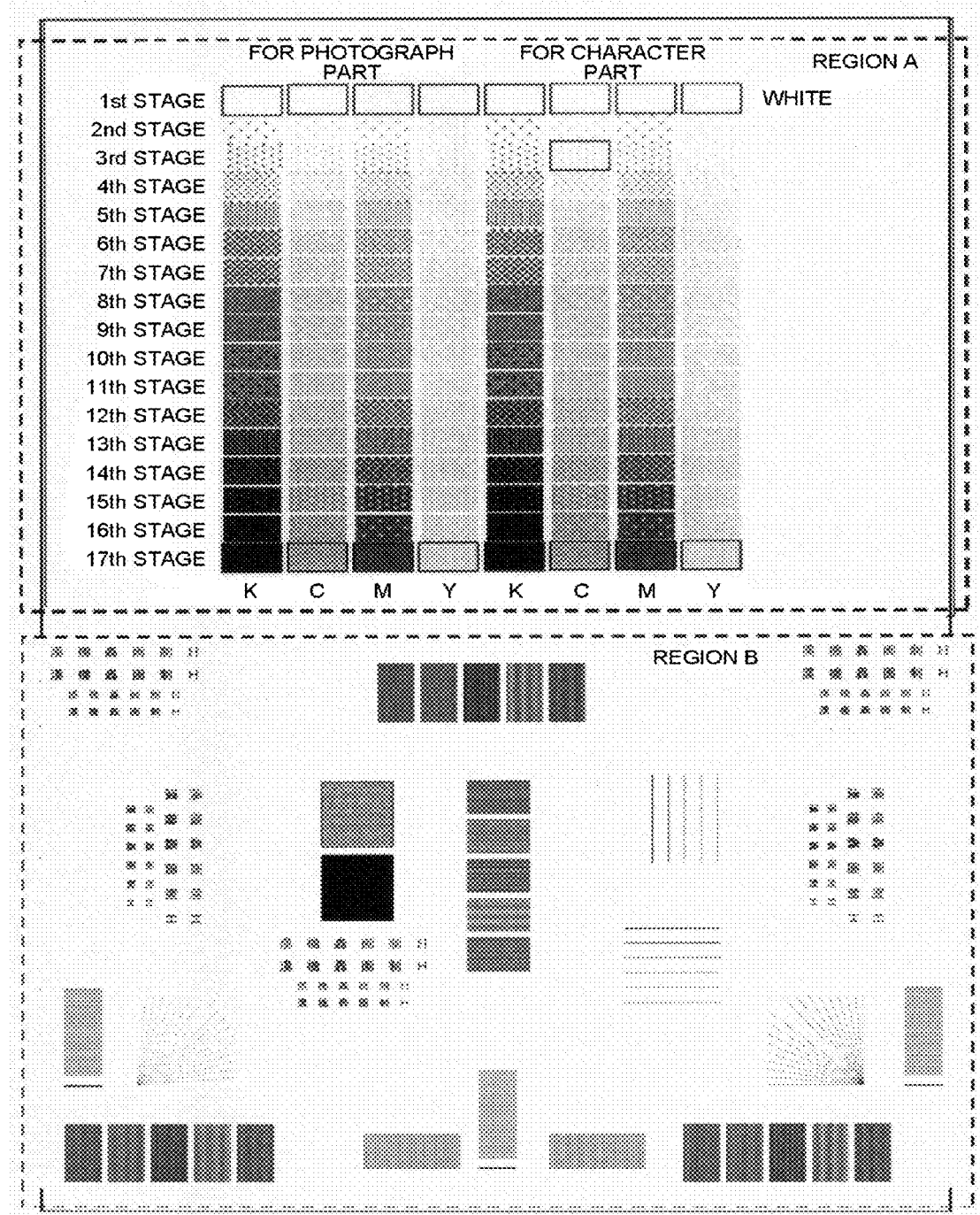
FIG. 20 is a schematic diagram for explaining adjustment of an ACS determination condition and γ calibration using a scanner device according to the embodiment of the present invention.

In the embodiment, an internal pattern as illustrated in FIG. 20 is stored in a controller (not illustrated) that controls the entire image processing device 1. The internal pattern is developed in a frame memory as a bitmapped CMYBk image data. As illustrated in a region A of FIG. 20, an image corresponding to a reading pattern for calibration is output to a recording sheet set by a user based on the CMYBk data in the image recording unit 103.

The original reading unit 101 described above outputs RGB digital image data based on contrast information of the original obtained by scanning the set original with a scanner.

The original reading unit 101 includes a line sensor including a CCD photoelectric conversion element, an A/D converter, and a drive circuit thereof, and generates and outputs the RGB digital image data from the contrast information of the original obtained by scanning the set original. In this case, the original reading unit 101 corrects uneven reading in the digital image data such as shading and illuminance distortion generated due to a mechanism of the scanner.

The scaling unit 207 converts a size (resolution) of CMYK image data according to reproducibility of a plotter device. In the embodiment, conversion is not specifically performed. In the calibration operation, the γ correction unit for the plotter does not specifically perform γ conversion (what is called "γ through output"), and outputs the data without correcting a characteristic of a plotter engine.

Figure 21:
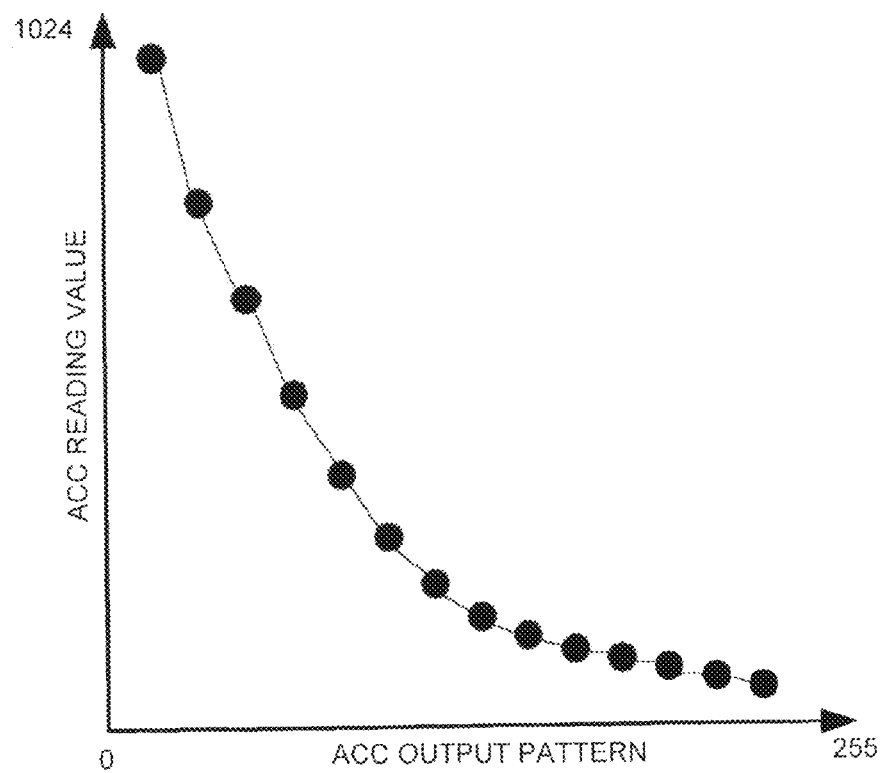
FIG. 21 is a schematic diagram for explaining a method of calculating an engine Raw γ characteristic in calibration using a scanner reading value according to the embodiment of the present invention.

The controller that controls the entire image processing device 1 acquires a reading value output from the original reading unit 101 [an average value of each of the RGB values in a reading region] for the RGB digital image data [scanner reading value] of a gradation pattern in the region A of FIG. 20 described above. As illustrated in FIG. 21, an ACC reading value of RGB obtained as described above is set as the ACC reading value with respect to an ACC pattern output level. In this case, the ACC pattern output level is a value written into the plotter engine, and the ACC reading value corresponds to plotter output density.

Figure 22:
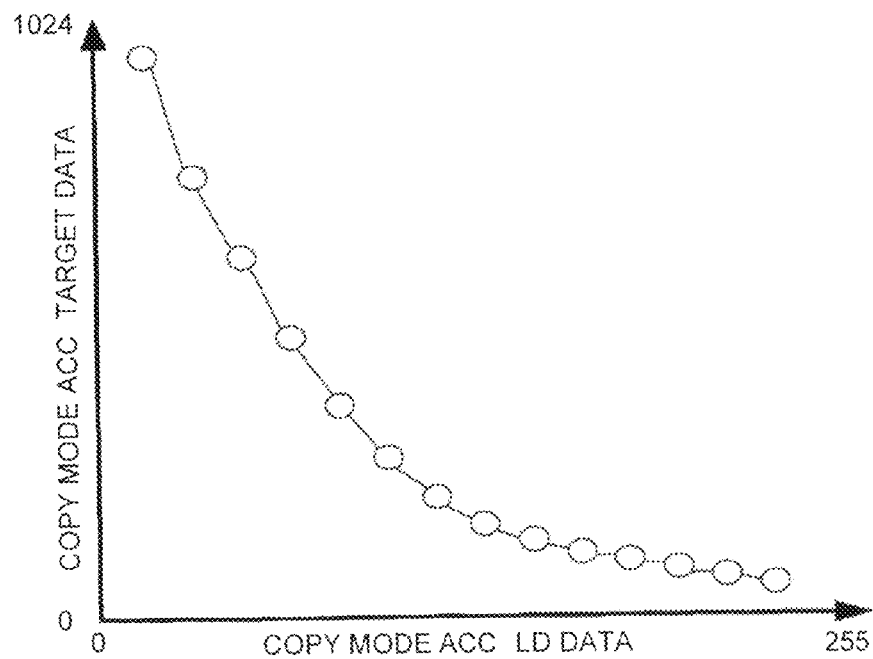
FIG. 22 is a schematic diagram for explaining a method of calculating target data in calibration using the scanner reading value according to the embodiment of the present invention.

The controller acquires an ACC target set with a scanner RGB reading value as described below for each CMYK corresponding to a recording sheet set by an operator, and sets it as input/output characteristic data of the plotter as illustrated in FIG. 22. The input/output characteristic data corresponds to output density of the plotter with respect to a CMYK data input each color of which is 8 bits that is operated by the gradation processing unit 210 illustrated in FIG. 2. In this case, the ACC target corresponds to target density, and the output density of the plotter is converted into a reading value of the scanner.

Target data [CMYK density target] in a copy mode ACC is as follows, for example.
<RGB_K> 1020, 956, 883, 791, 692, 593, 489, 407, 333, 255, 195, 144, 113, 84, 60, 43, 31
<RGB_C> 1020, 968, 909, 843, 771, 691, 596, 511, 443, 377, 310, 250, 193, 149, 109, 83, 69
<RGB_M> 1020, 985, 945, 900, 846, 763, 667, 581, 502, 425, 355, 291, 231, 186, 141, 103, 86
<RGB_Y> 1020, 996, 969, 920, 865, 804, 738, 675, 618, 557, 496, 446, 395, 359, 328, 300, 286
LD data [CMYK input data] in the copy mode ACC is as follows, for example.
<LD> 0, 16, 32, 48, 64, 80, 96, 112, 128, 144, 160, 176, 192, 208, 224, 240, 255

High-density correction parameters in the copy mode ACC are as follows, for example. The high-density correction parameters specify ON/OFF setting of copy LD data.
<FLAG_K> ON, ON, ON, ON, ON, ON, ON, ON, ON, ON, ON, OFF, OFF, OFF, OFF, OFF, OFF
<FLAG_C> ON, ON, ON, ON, ON, ON, ON, ON, ON, ON, ON, OFF, OFF, OFF, OFF, OFF, OFF
<FLAG_M> ON, ON, ON, ON, ON, ON, ON, ON, ON, ON, ON, OFF, OFF, OFF, OFF, OFF, OFF
<FLAG_Y> ON, ON, ON, ON, ON, ON, ON, ON, ON, ON, ON, OFF, OFF, OFF, OFF, OFF, OFF Top density, that is, solid density varies depending on an image formation condition for the plotter, so that an ACC tracking OFF point is acquired from the high-density correction parameters. The top density as a digital value of an actual device is read from ACC reading data. Here, a starting point of ACC tracking OFF and an ending point of ACC tracking OFF are read from the ACC high-density correction parameters. The starting point of ACC tracking OFF is the lowest density point where the target density is changed according to the top density, and the ending point of the ACC tracking OFF is the highest density point where the target density is changed according to the top density.

In this case, the following relation is satisfied.
Starting point of ACC tracking OFF: LD=176
Ending point of ACC tracking OFF: LD=255

Data corresponding to the top density of the actual device, that is, a reading value is extracted from an ACC pattern reading value.

Figure 23:
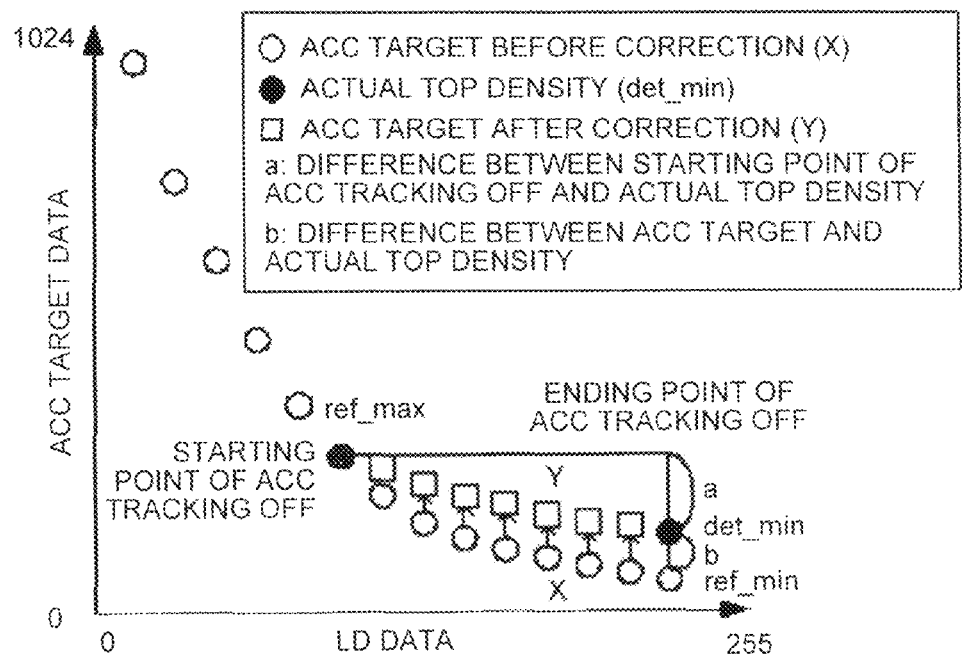
FIG. 23 is a schematic diagram for explaining correction of a high-density portion in calibration according to the embodiment of the present invention.

Assuming that
ACC target data of the starting point of ACC tracking OFF: ref_max
ACC target data of the ending point of ACC tracking OFF: ref_min
ACC reading data (16th-stage patch corresponding to the top density): det_min
ACC target before correcting a high-density portion ACC target: X
ACC target after correcting a high-density portion ACC target: Y,
a correction value of the high-density portion is as follows.
[reference flag] where tracking "ON", Y=X
[reference flag] where tracking "OFF", $$Y=ref\_max-(ref\_max-X)*(ref\_max-det\_min)/(ref\_max-ref\_min)$$

Where ref_max=ref_min, Y=ref_max.
The obtained ACC target after correction is associated with the LD data to be tabulated as illustrated in FIG. 23. A target value between the ACC tracking starting point and the top density is obtained through linear interpolation. The high-density portion correction parameters described here are switched according to an image output mode set by an operator, so that the tracking on the high-density portion side varies.

For example, when a photograph output mode is set, a gradation level of tracking OFF is increased so as to obtain color reproduction focusing on the gradation property of the high-density portion. In contrast, when an output mode focusing on character reproduction is selected, the parameters are set so that the gradation level of tracking OFF is decreased.

A CPU of the image processing device 1 acquires ACC target background portion data "Acc_T1" and a reading value "B_Det" of the background portion (first stage) from the ACC reading value. A difference between the reading value "B_Det" of the background portion (first stage) and the ACC target background portion data "Acc_T1" is taken, and a correction value "Cng_Acc_Tn" of each ACC reading value is obtained as follows.

$$Cng\_Acc\_Tn=(B\_Det-Acc\_T1)*Acc\_U\_Crct/100$$

n corresponds to the number of stages [1 to 17] illustrated in FIG. 20.

The correction value is added to each ACC reading value "Acc_Sn" to perform correction. All of the ACC reading values are corrected as follows.

$$Acc\_Sn'=Acc\_Sn+Cng\_Acc\_Tn$$

A background correction parameter with respect to the ACC reading value is as follows, for example. In the following description, Acc_Scn represents the ACC reading value, and Acc_U_Crct represents a correction factor [unit: (%)].
<parameter> reference data for background correction
For character part
<Black>
<Acc_Scn> 0, 258, 518, 915, 1024 </Acc_Scn>
<Acc_U_Crct>   0,   0,   100,   100,   100 </Acc_U_Crct><Cyan>
<Acc_Scn> 0, 303, 555, 915, 1024 </Acc_Scn>
<Acc_U_Crct> 0, 0, 100, 100, 100 </Acc_U_Crct>
<Magenta>
<Acc_Scn> 0, 367, 623, 915, 1024 </Acc_Scn>
<Acc_U_Crct> 0, 0, 100, 100, 100 </Acc_U_Crct>
<Yellow>
<Acc_Scn> 0, 477, 699, 915, 1024 </Acc_Scn>
<Acc_U_Crct>0, 0, 100, 100, 100 </Acc_U_Crct>

For photograph part
<Black>
<Acc_Scn> 0, 258, 518, 915, 1024 </Acc_Scn>
<Acc_U_Crct> 0, 0, 100, 100, 100 </Acc_U_Crct>
<Cyan>
<Acc_Scn> 0, 303, 555, 915, 1024 </Acc_Scn>
<Acc_U_Crct> 0, 0, 100, 100, 100 </Acc_U_Crct>
<Magenta>
<Acc_Scn> 0, 367, 623, 915, 1024 </Acc_Scn>
<Acc_U_Crct> 0, 0, 100, 100, 100 </Acc_U_Crct>
<Yellow>
<Acc_Scn> 0, 477, 699, 915, 1024 </Acc_Scn>
<Acc_U_Crct> 0, 0, 100, 100, 100 </Acc_U_Crct>

As described above, the parameters are set for each image formation version of the character part and the photograph part.

Next, the following describes a method for correcting the background according to the embodiment.

Step 1

Figure 24:
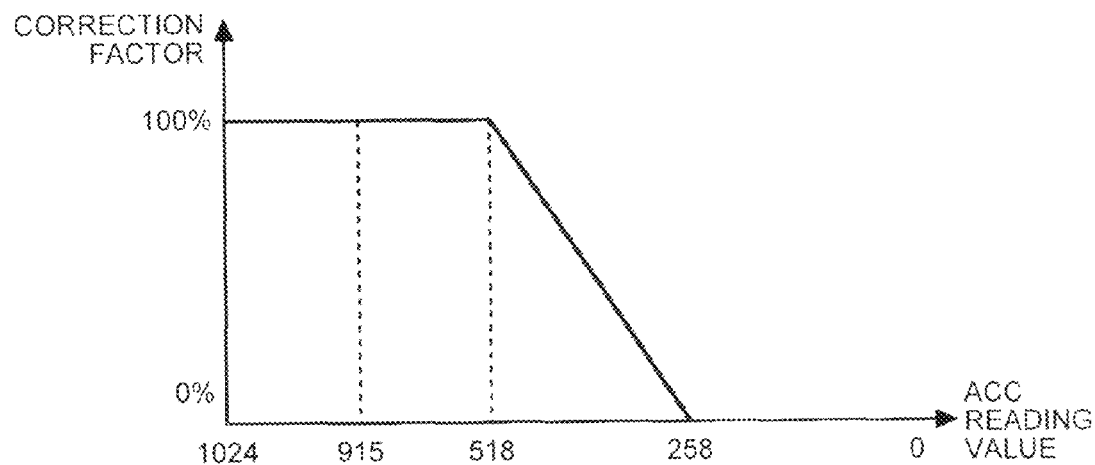
FIG. 24 is a schematic diagram for explaining a background correction factor with respect to an ACC reading value according to the embodiment of the present invention.

The background correction factor for an arbitrary ACC reading value is obtained as follows. FIG. 24 schematically illustrates the correction factor with respect to the ACC reading value of the parameter using an example of the character <Black> in the parameter described above. The horizontal axis represents the ACC reading value, and the vertical axis represents the correction factor. An origin is set to 1024 here. The background correction factor to be actually used is a value obtained by linearly interpolating the correction factor between the parameters according to the ACC pattern reading value. The solid line in the drawing represents the correction factor with respect to the reading value.

Step 2

The background portion[0-th stage] of the ACC target data is acquired to be an ACC target background portion "Acc_T0".

Step 3

A difference between the ACC pattern reading value "B_Det" of the background portion[0-th stage] and the data of the ACC target background portion "Acc_T0" is taken, and the correction value "Cng_AccT_k" of each ACC reading value is obtained as follows.

$$Cng\_AccT\_k=(Acc\_T0-B\_Det)*Acc\_U\_Crct\_k/100$$

k represents correction on the reading value of the k-th stage (k=0 to 16).

Step 4

The background correction value "Cng_AccT_k" obtained at Step 3 is added to each ACC reading value "Acc_Scn_k" to perform correction as follows. The correction is performed on all of the ACC reading values.

$$Acc\_Scn\_k'=Acc\_Scn\_k+Cng\_AccT\_k$$

k represents correction on the reading value of the k-th stage (k=0 to 16).

Next, using the ACC target in which the high-density portion is corrected, target data is obtained from a control point input parameter using the following steps. An example of the control point input parameter is as follows.

Sixteen types of parameters are assumed here: 00h, 11h, 22h, 33h, 44h, 55h, 66h, 77h, 88h, 99h, AAh, BBh, CCh, DDh, EEh, and FFh.

Step 1

First, a position of the control point input parameter is found among points of the LD data. The control point input parameter is assumed to be "An". "n" represents the order of the control point input parameter. The LD data is assumed to be "Ldn". "n" represents the order of the LD data. Regarding the control point input parameter, a relation between An and the LD data is obtained as follows.

$$Ldn-1<An\leq Ldn$$

if Ldn=0, Ldn-1≤An≤Ldn.

Step 2

Next, a linear interpolation expression is obtained from the target data with respect to Ldn−1 and Ldn, and the target data is obtained from the control point input parameter. The target data is assumed to be "Acc_Tn" here. "n" represents the order of LD data to which the target data corresponds. The interpolated target data is assumed to be "Acc_Tn'". "n" represents the order of the control point input parameter. When the target data is assumed to be "Acc_Tn", the target data with respect to the control point input parameter is obtained as follows.

$$Acc\_Tn'=((Acc\_Tn-Acc\_Tn-1)/(Ldn-Ldn-1))*(An-Ldn)+Acc\_Tn$$

Step 3

The steps described above are repeated by the number of control point input parameters to obtain the target data.

Step 4

Next, the target data is obtained as follows from the control point input parameter using the ACC target described above. First, the position of the target data obtained at Step 3 is found among points of the ACC reading value. The target data is assumed to be "Acc_Tn'" here. "n" represents the order of the control point input parameter. The ACC reading value is assumed to be "Acc_Sm'". "m" represents the order of the ACC reading value. A relation between the target data "Acc_Tn'" and the ACC reading value is obtained as follows.

$$Acc\_Sm'-1<Acc\_Tn'\leq Acc\_Sm'$$

if Acc_Sm'=0, Acc_Sm'−1≤a≤Acc_Sm'.

The linear interpolation expression is then obtained from an ACC output pattern with respect to "AccSn'−1" and "Acc_Sm'", and ACC output pattern data is obtained from the target data. The ACC output pattern data is assumed to be "Acc_Pm" here. "m" represents the order of the ACC output pattern to which the pattern corresponds. The interpolated ACC output pattern data is assumed to be "Acc_Pm'". When the ACC output pattern is assumed to be "Acc_Pm", the target data with respect to the control point input parameter is obtained as follows.

$$Acc\_Pm'=((Acc\_Pm-Acc\_Pm'-1)/(Acc\_Sm'-Acc\_Sm'-1))*(Acc\_Tn'-Acc\_Sm')+Acc\_Pm$$

The steps described above are repeated by m times of "Acc_Sm'" to obtain the target data.

Figure 25:
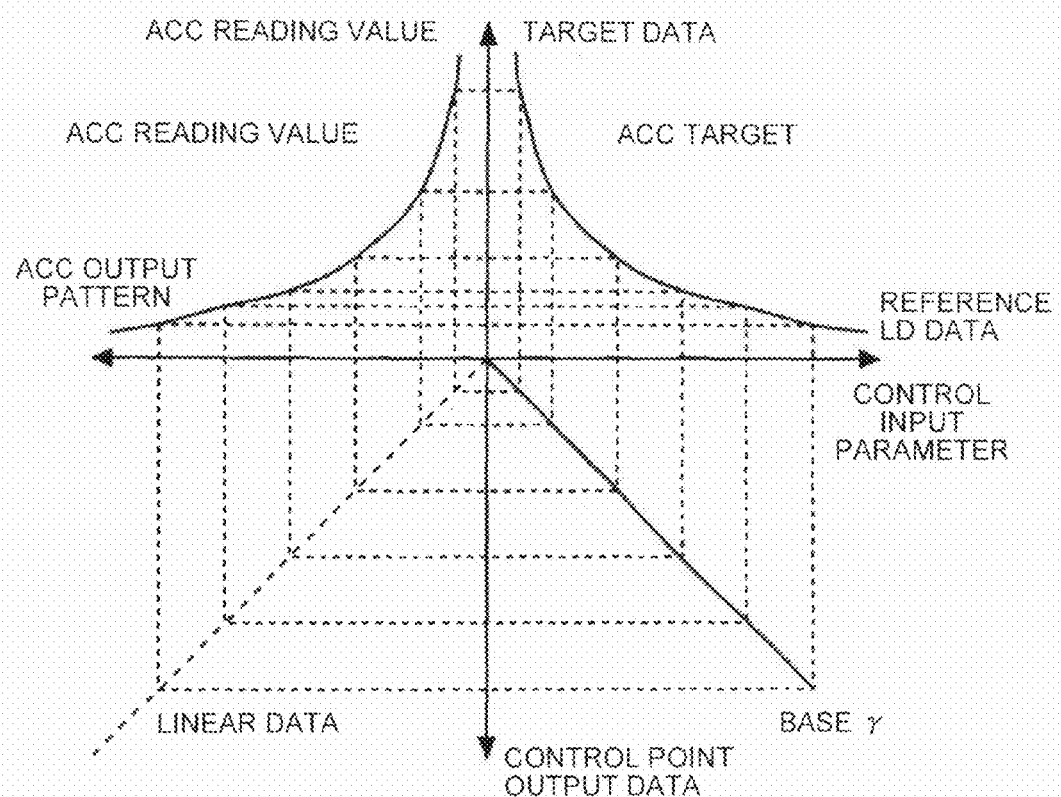
FIG. 25 is a schematic diagram for explaining a method of calculating a base γ control point in calibration using the scanner reading value according to the embodiment of the present invention.

Next, FIG. 25 illustrates a conceptual diagram of a method for calculating the base γ control point parameter according to the embodiment. The thus calculated "AccPm'" becomes a control point output parameter, so that a final base γ control point parameter is as follows: [control point input parameter, control point output parameter]=[Am, AccPm'].

In the embodiment, the calculation of the base γ control point parameter and setting of a γ table are performed by the controller that controls the image processing device 1. The γ table that corrects the plotter output characteristic to a target characteristic is set by the CMYBk γ correction unit 209 illustrated in FIG. 2. Then table conversion for each CMYK-version is performed using a γ table for an edge for CMYK and a γ table for a non-edge to perform γ correction.

Here, the γ table set to the CMYBk γ correction unit 209 is a look-up table (output values of 0 to 255) with respect to input values 0 to 255 for each CMYK-version. The controller that controls the image processing device 1 interpolates between adjacent base γ control points with a cubic spline curve to create the look-up table with respect to the input values 0 to 255.

Next, a γ table set to the CMYBk γ correction unit 209 in FIG. 2 is obtained using a generally known cubic interpolation expression that satisfies a boundary condition illustrated in FIG. 26.

Operation of Adjusting Automatic Color Selection Condition

Next, the following describes an adjustment of an automatic color selection condition using the scanner reading value of the test pattern actually formed on the recording sheet in the image processing device 1 according to the embodiment, with reference to FIG. 27.

The embodiment includes a color determination difference detecting module as a function of the original recognizing unit 202. The color determination difference detecting module detects a difference between a color determination result obtained by the color determining unit 302 with respect to the test pattern output on the recording medium by the test pattern output module and a color determination result obtained by the color determining unit 302 with respect to the test pattern output on a standard recording medium set as a standard in advance.

In the embodiment, a condition for division determination into color regions by the color determining unit 302 is changed according to a color tone of the background detected from the recording medium on which the test pattern is output. Accordingly, even when a user registers a plurality of types of originals having the backgrounds of different color tones including a color sheet, that is, recording sheets on which the test pattern is formed, accuracy in determination in ACS with respect to a standard sheet can be maintained and convenience of a user can be enhanced.

In the embodiment, an automatic color selection condition adjusting module is included as a function of the original recognizing unit 202. The automatic color selection condition adjusting module adjusts a white pixel determination threshold and a black pixel determination threshold used for determination by the automatic color determining module according to a color determination difference detection result obtained by the color determination difference detecting module.

The adjustment of the white pixel determination threshold by the automatic color selection condition adjusting module includes at least an adjustment of the white pixel determination threshold according to a difference detection result between a reading value of the background portion with respect to a standard recording medium and a reading value of the background portion with respect to the test pattern output on the recording medium detected by the color determination difference detecting module. In the embodiment, the white pixel determination threshold is set for each hue.

The adjustment of the black pixel determination threshold by the automatic color selection condition adjusting module includes at least an adjustment of the black pixel determination threshold that causes an image read from a test pattern including an edge portion of the black region to be determined as a monochrome image and is set for each hue.

Accordingly, even when there is a color tone difference in paper white of the original used by a user, and/or there is a variation in a scanner reading characteristic and/or the like, accuracy in determination in ACS can be maintained and convenience of a user can be enhanced.

In the embodiment, the white pixel determination threshold and the black pixel determination threshold used for determination by the automatic color determining module is changed according to an image output condition set in advance. Accordingly, even when there is a color tone difference in paper white of the original, and/or there is a variation in a scanner reading characteristic and/or the like, accuracy in determination in ACS can be improved adapting to the image output condition set by an operator.

The automatic color selection condition adjusting module adjusts the white pixel determination threshold and the black pixel determination threshold according to a calibration condition when the image is input or output. Accordingly, even when there is a color tone difference in paper white of the original, and/or there is a variation in a scanner reading characteristic and/or a plotter output characteristic, accuracy in determination in ACS can be improved according to the image output condition.

In addition, the calibration condition includes at least a background tracking condition with respect to an image output characteristic of the plotter. Accordingly, even when there is a color tone difference in paper white of the original, and/or there is a variation in a scanner reading characteristic and/or the like, accuracy in determination in ACS can be improved considering tracking of gray balance with respect to the background.

In the embodiment, the test pattern actually formed on the recording sheet is read by the scanner and the automatic color selection condition is adjusted. Accordingly, even when there is a color tone difference in paper white of the original used by a user, and/or there is a variation in a scanner reading characteristic and/or the like, accuracy in determination in ACS can be maintained, and quality of the output image and copy productivity can be kept.

First, an ACC pattern is input to the image processing device 1 according to the embodiment (Step S101). A recording medium on which the ACC pattern is output is output as an original, and the output original is scanned so that the original reading unit 101 reads the ACC pattern (Step S102).

Next, a base γ control point is updated for RGB image data obtained by reading the ACC pattern (Step S103).

It is determined whether to perform ACS determination adjustment based on a request from a user (Step S104). If it is determined that the ACS determination adjustment is to be performed (Yes at Step S104), the color determination difference detecting module then detects a white background level of the RGB image data (Step S105). On the other hand, if it is determined that the ACS determination adjustment is not to be performed (No at Step S104), the process is finished.

Subsequently, the automatic color selection condition adjusting module changes a white pixel threshold for ACS according to the detected white background level (Step S106). Then a hue of a line drawing pattern portion is determined (Step S107). In addition, a black pixel threshold is changed for each hue (Step S108). Hereinafter, more detailed description will be provided.

In the embodiment, color auto selection is performed at the same time as the ACC operation using the scanner reading value with the MFP described above. Due to this, the internal pattern as illustrated in FIG. 20 that is stored in the controller that controls the entire image processing device 1 is developed as a bitmapped ACC pattern image data in the frame memory. Then an image corresponding to a reading pattern for adjusting the automatic color selection condition is output to the recording sheet set by a user based on the CMYBk data in the image recording unit 103 as illustrated in a region B of FIG. 20.

The original reading unit 101 described above outputs the RGB digital image data based on the contrast information of the original obtained by scanning the set original with the scanner.

The original reading unit 101 includes the line sensor including a CCD photoelectric conversion element, the A/D converter, and the drive circuit thereof, and generates and outputs the RGB digital image data from the contrast information of the original obtained by scanning the set original. In this case, the original reading unit 101 corrects unevenness of reading in the digital image data such as illuminance distortion generated due to the mechanism of the scanner such as shading.

The scaling unit 207 converts the size (resolution) of the CMYK image data according to reproducibility of the plotter device. In the embodiment, conversion is not specifically performed. In the embodiment, the γ correction unit for the plotter does not specifically perform γ conversion (what is called "γ through output"), and outputs the data without correcting the characteristic of the plotter engine.

As described above, the controller that controls the entire image processing device 1 performs ACC with respect to the output γ conversion characteristic of the plotter using the gradation pattern of the region A illustrated in FIG. 20. In this case, when an operator makes a request to adjust the ACS determination condition via an operation unit, a test pattern including at least an edge portion of the black region in the region B of FIG. 20 and the RGB digital image data of the background portion corresponding to the first stage in the region A in the drawing are acquired.

For example, the controller adjusts thwr, thwg, and thwb set by the hue dividing unit 401 described above as follows, based on the scanner RGB digital image data of the background portion, that is, an average value of each of the RGB values in the reading region.

$$Hthwr = thwr - Rst + R$$

$$Hthwg = thwg - Gst + G$$

$$Hthwb = thwb - Bst + B$$

Here, "thwr" is a W pixel determination threshold for R data set to a standard sheet in advance, "thwg" is a W pixel determination threshold for G data set to the standard sheet in advance, and "thwb" is a W pixel determination threshold for B data set to the standard sheet in advance.

"Hthwr" is a W pixel determination threshold for the R data changed by adjusting the automatic color selection condition, "Hthwg" is a W pixel determination threshold for the G data changed by adjusting the automatic color selection condition, and "Hthwb" is a W pixel determination threshold for the B data changed by adjusting the automatic color selection condition.

"Rst" is a reading value of a scanner R component with respect to the background portion of the standard sheet, "Gst" is a reading value of a scanner G component with respect to the background portion of the standard sheet, and "Bst" is a reading value of a scanner B component with respect to the background portion of the standard sheet.

"R" is a reading value of the scanner R component with respect to the background portion of the recording sheet in adjusting the automatic color selection condition, "G" is a reading value of the scanner G component with respect to the background portion of the recording sheet in adjusting the automatic color selection condition, and "B" is a reading value of the scanner B component with respect to the background portion of the recording sheet in adjusting the automatic color selection condition.

In adjusting the black pixel determination thresholds [thy, thm, thc, thr, thg, thb] for each hue with respect to the RGB difference, the ACS determination described above is performed on the region B of FIG. 20. The black pixel determination threshold for the color region to be subjected to the color determination is incremented by 1, and the ACS determination is performed on the region B of FIG. 20 again. This process will be repeated until the monochrome determination is made, and the thresholds are changed to the black pixel determination thresholds [thy', thm', thc', thr', thg', thb'] with which the monochrome determination is finally made.

Another embodiment of the color determining unit 302

Next, the following describes another embodiment of the color determining unit 302 according to the embodiment described above with reference to FIG. 28 and FIG. 29. When the hue dividing unit 401 of the color determining unit 302 in FIG. 16 described above divides color into the signals of R, G, B, C, M, Y, Bk, and W, white pixel determination may be performed for each hue after determining the hue as described below. Also in another embodiment, the RGB data is blackened as the number increases.

[1] R-Y hue region boundary (ry)
when R−2*G+B>0, ry=1
if not, ry=0
[2] Y-G hue region boundary (rg)
when 11*R−8*G−3*B>0, rg=1
if not, yg=0
[3] G-C hue region boundary (gc)
when 1*R−5*G+4*B<0, gc=1
if not, gc=0
[4] C-B hue region boundary (cb)
when 8*R−14*G+6*B<0, cb=1
if not, cb=0
[5] B-M hue region boundary (bm)
when 9*R−2*G−7*B<0, bm=1
if not, bm=0
[6] M-R hue region boundary (mr)
when R+5*G−6*B<0, mr=1
if not, mr=0
[7] Y region W pixel determination
when [ry==1] && [yg==0] && [R<thywr] && [g<thywg] && [B<thywb], y=m=c=0.
[8] Y region chromatic [Y] pixel determination
when [ry==1] && [yg==0] && [RGB difference>thy], y=1, and m=c=0.
[9] G region W pixel determination
when [rg==1] && [gc==0] && [R<thgwr] && [g<thgwg] && [B<thgwb], y=m=c=0.x
[10] G region chromatic [G] pixel determination
when [rg==1] && [gc==0] && [RGB difference>thg], c=y=1, and m=0.
[11] C region W pixel determination
when [gc==1] && [cb==0] && [R<thcwr] && [g<thcwg] && [B<thcwb], y=m=c=0.
[12] C region chromatic [C] pixel determination
when [gc==1] && [cb==0] && [RGB difference>thc], c=1, and m=y=0.
[13] B region W pixel determination
when [cb==1] && [bm==0] && [R<thbwr] && [g<thbwg] && [B<thbwb], y=m=c=0.
[14] B region chromatic [B] pixel determination
when [cb==1] && [bm==0] && [RGB difference>thb], c=m=1, and y=0.

[15] M region W pixel determination when [bm==1] && [mr==0] && [R<thmwr] && [g<thcwg] && [B<thmwb], y=m=c=0.

[16] M region chromatic [M] pixel determination when [bm==1] && [mr==0] && [RGB difference>thm], m=1, and y=c=0.

[17] R region W pixel determination when [mr==1] && [ry==0] && [R<thrwr] && [g<thrwg] && [B<thrwb], y=m=c=0.

[18] R pixel determination when [mr==1] && [ry==0] && [RGB difference>thr], y=m=1, and c=0.

[19] Bk pixel determination if not falling under the above conditions of [7] to [18], y=m=c=1.

Priority is given to a smaller number among [7] to [19] described above. thywr, thywg, thywb, thgwr, thgwg, thgwb, thcwr, thcwg, thcwb, thbwr, thbwg, thbwb, thmwr, thmwg, thmwb, thrwr, thrwg, thrwb, thy, thm, thc, thr, thg, and thb are thresholds determined before copying processing.

The RGB difference is a difference between the maximum value and the minimum value of each piece of RGB image data in one pixel. As an output signal, 3 bits of c, m, and y are output. That is, c, m, y, r, g, b, and bk are represented by 3 bits. The threshold is changed for each hue, because a chromatic range is different for each hue region and the thresholds depending on the hue regions are determined. The hue division in this case is merely an example, and not limited thereto. It may be represented by other expressions.

Five lines of outputs c, m, and y from the hue dividing unit 401 are stored in each of the line memories 402 to 404, and input to the color pixel determining unit 405. The five lines of data of c, m, and y are input to the counting units 501 and 502, and the pattern matching unit 503.

The pattern matching unit 503 performs pattern matching on the pixel (color pixel) other than the pixel in which all of c, m, and y are 1 [c=m=y=1] or all of c, m, and y are 0 [c=m=y=0] in 5×5 of pixels [c, m, and y] determined by the hue dividing unit 401. That is, any of the following patterns is satisfied, the pixel is nominated as the candidate 2 for the color pixel.

Here, 4-bit hue region determination is described. Upon division into 12 hue color regions and signals of Bk and W in the hue dividing unit 401 of the color determining unit 302 in FIG. 16, hue determination may be performed as follows.

Figure 28:
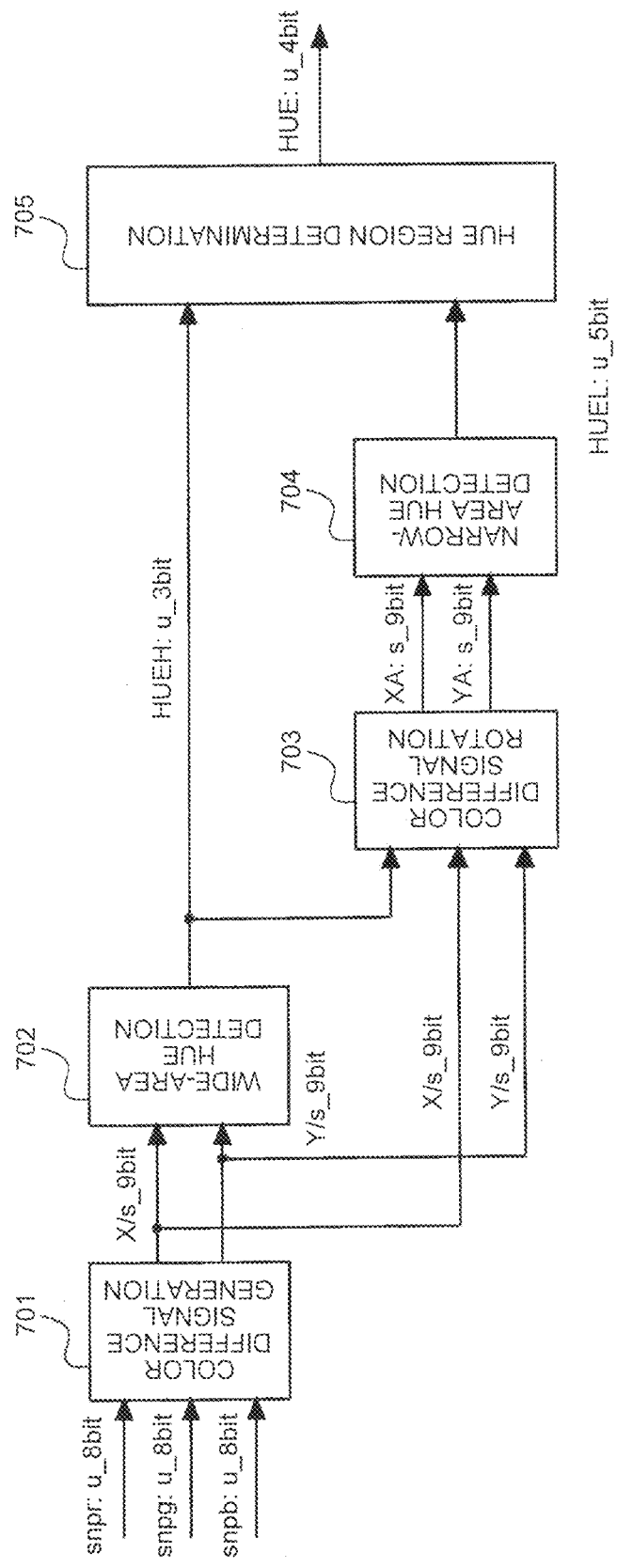
FIG. 28 is another block diagram of hue region determination in the color determining unit according to the embodiment of the present invention.

In this hue region determination, as illustrated in FIG. 28, an image signal [snpr, snpg, snpb: 8 bit] is converted into a hue signal [HUE: 8 bit] to be compared with a set value of a hue boundary register [HUE00 to HUE11: 8 bit]. A hue region [divided into 12 parts] is determined based on the comparison result to output a hue region signal [Huejo: 4 bit].

Color Difference Signal Generation

The following describes color difference signal generation in a color difference signal generation 701. The color difference signal [X, Y: s_9 bit] is generated from the image signal [snpr, snpg, snpb: u_8 bit] using the following expressions.

X=snpg−snpr
Y=snpb−snpg

When X is equal to or larger than 0, X=X/2.

Wide-Area Hue Detection

Figure 29:
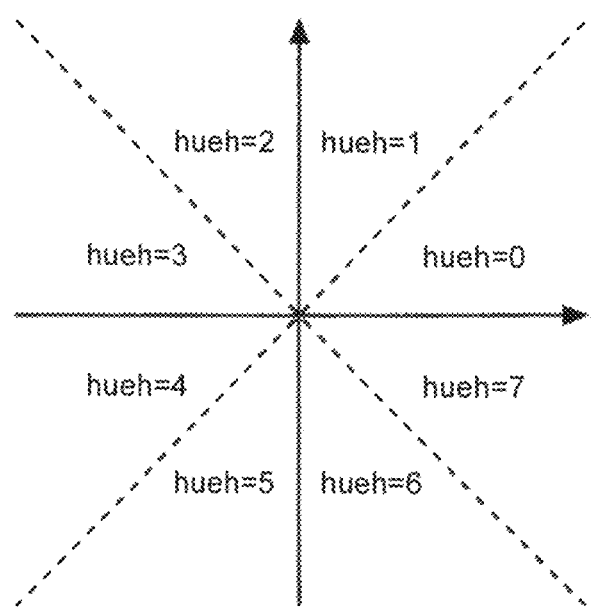
FIG. 29 is a schematic diagram for explaining wide-area hue division in another hue region determination according to the embodiment of the present invention.

The following describes wide-area hue detection in a wide-area hue detection 702. A wide-area hue signal [HUEH: u_3 bit] is generated from the color difference signal [X, Y: s_9 bit]. The wide-area hue signal "HUEH" indicates a position when an X-Y signal plane is divided into 8 parts as illustrated in FIG. 29.

The wide-area hue is detected with the following conditional expressions.

!HT1 and HT0 . . . HUEH=0
!HT2 and HT1 . . . HUEH=1
!HT3 and HT2 . . . HUEH=2
!HT4 and HT3 . . . HUEH=3
!HT5 and HT4 . . . HUEH=4
!HT6 and HT5 . . . HUEH=5
!HT7 and HT6 . . . HUEH=6
!HT0 and HT7 . . . HUEH=7
other than the above (Y=X=0) . . . HUEH=7
HT1 to HT7 are as follows.
HT0=(Y≥0)
HT1=(Y≥X)
HT2=(X≤0)
HT3=(Y≤−X)
HT4=(Y≤0)
HT5=(Y≤X)
HT6=(X≥0)
HT7=(Y≥−X)

Color Difference Signal Rotation

Next, the following describes color difference signal rotation in a color difference signal rotation 703. The color difference signal "XA, YA: S9 bit" is generated according to the wide-area hue signal "HUEH: 3 bit". The color difference signal [XA, YA] is coordinates when the color difference signal plane [X, Y] is rotated to be moved to a region of "HUEH=0".

when HUEH=0, XA=X, and YA=Y
when HUEH=1, XA=X+Y, and YA=−X+Y
when HUEH=2, XA=Y, and YA=−X
when HUEH=3, XA=−X+Y, and YA=−X−Y
when HUEH=4, XA=−X, and YA=−Y
when HUEH=5, XA=−X−Y, and YA=X−Y
when HUEH=6, XA=−Y, and YA=X
when HUEH=7, XA=X−Y, and YA=X+Y Narrow-Area Hue Detection Next, the following describes narrow-area hue detection in a narrow-area hue detection 704. A narrow-area hue signal "HUEL: 5 bit" is generated from the color difference signal "XA, YA: S9 bit". The narrow-area hue signal "HUEL" is an inclination "HUEL/32=YA/XA" of color difference signal plane coordinates.

when XA is 0, HUEL=0x1F
other than the above, HUEL=(YA<<5)/XA

Hue Boundary Register

Next, the following describes the hue boundary register. A set value of the hue boundary register "HUE00 to HUE11: 8 bit" is output. The hue boundary register is set so as to satisfy 0≤HUE00≤HUE01≤HUE02≤ . . . ≤HUE10≤HUE11≤0xFF.

Hue Region Determination

Next, the following describes the hue region determination.

A hue region determination 705 compares a hue boundary signal "HUE00 to HUE11: 8 bit" with a hue signal "HUEHL {HUEH, HUEL}: 8 bit" to generate a hue region "HUE: 4 bit".

HUE00<HUEHL≤HUE01 . . . HUE=1
HUE01<HUEHL≤HUE02 . . . HUE=2
HUE02<HUEHL≤HUE03 . . . HUE=3
HUE03<HUEHL≤HUE04 . . . HUE=4
HUE04<HUEHL≤HUE05 . . . HUE=5
HUE05<HUEHL≤HUE06 . . . HUE=6
HUE06<HUEHL≤HUE07 . . . HUE=7
HUE07<HUEHL≤HUE08 . . . HUE=8

HUE08<HUEHL≤HUE09 ... HUE=9
HUE09<HUEHL≤HUE10 ... HUE=10
HUE10<HUEHL≤HUE11 ... HUE=11
other than the above ... HUE=0

The final condition is equivalent to "HUE11<HUEHL" && "HUEHL≤HUE00". The symbol "&&" means a condition "and".

The embodiments described above are preferred embodiments according to the present invention, and can be variously modified without departing from the gist of the invention. For example, each piece of the processing in the image processing device 1 according to the embodiments can be performed using hardware, software, or a composite structure thereof.

To perform the processing using software, a computer program in which a processing sequence is recorded can be installed in a memory in a computer incorporated into dedicated hardware to be executed. Alternatively, the computer program can be installed in a general purpose computer that can perform various processing to be executed.

According to an aspect of the present invention, it is possible to improve determination accuracy in color auto selection and improve convenience of an operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
an original reading module that reads an image from an original;
a color determining module that performs division determination into color regions including at least black and white for each pixel on the image read from the original by the original reading module;
an automatic color determining module that determines whether the image read from the original by the original reading module is a color image or a monochrome image according to a color determination result obtained by the color determining module;
a test pattern output module that outputs a test pattern including at least an edge portion of a black region on a recording medium;
a color determination difference detecting module that detects a difference between a color determination result obtained by the color determining module with respect to the test pattern output on the recording medium by the test pattern output module and a color determination result obtained by the color determining module with respect to the test pattern output on a standard recording medium set as a standard in advance; and
an automatic color selection condition adjusting module that adjusts a white pixel determination threshold and a black pixel determination threshold used for determination by the automatic color determining module according to a color determination difference detection result obtained by the color determination difference detecting module.

2. The image processing device according to claim 1, wherein an adjustment of the white pixel determination threshold by the automatic color selection condition adjusting module includes at least an adjustment of the white pixel determination threshold according to a difference detection result between a reading value of a background portion with respect to the standard recording medium and a reading value of a background portion with respect to the test pattern output on the recording medium detected by the color determination difference detecting module.

3. The image processing device according to claim 1, wherein an adjustment of the black pixel determination threshold by the automatic color selection condition adjusting module includes an adjustment of the black pixel determination threshold that causes an image read from a test pattern including at least the edge portion of the black region to be determined as a monochrome image and is set for each hue.

4. The image processing device according to claim 1, wherein the white pixel determination threshold is set for each hue.

5. The image processing device according to claim 1, wherein a condition for division determination into color regions by the color determining module is changed according to a color tone of a background detected from the recording medium on which the test pattern is output.

6. The image processing device according to claim 1, wherein the white pixel determination threshold and the black pixel determination threshold used for determination by the automatic color determining module are changed according to an image output condition set in advance.

7. The image processing device according to claim 1, wherein the automatic color selection condition adjusting module adjusts the white pixel determination threshold and the black pixel determination threshold according to a calibration condition of when an image is input or output.

8. The image processing device according to claim 7, wherein the calibration condition includes at least a background tracking condition with respect to an image output characteristic of a plotter.

9. An image processing method comprising:
reading an image from an original with an original reading module and storing the read image in a storage unit;
performing division determination into color regions including at least black and white for each pixel on the image stored in the storage unit, and storing a color determination result in the storage unit;
automatically determining whether the image stored in the storage unit is a color image or a monochrome image according to the color determination result stored in the storage unit, and storing a determination result in the storage unit;
outputting a test pattern including at least an edge portion of a black region on a recording medium;
detecting a difference between a color determination result with respect to the test pattern output on the recording medium and a color determination result with respect to the test pattern output on a standard recording medium set as a standard in advance, and storing a detected color determination difference detection result in the storage unit; and
adjusting a white pixel determination threshold and a black pixel determination threshold used for the automatic color determination according to the color determination difference detection result stored in the storage unit.

10. A computer program product comprising a non-transitory computer-readable medium containing an information processing program, the program causing a computer to perform:
reading an image from an original with an original reading module and storing the read image in a storage unit;
performing division determination into color regions including at least black and white for each pixel on the image stored in the storage unit, and storing a color determination result in the storage unit;

automatically determining whether the image stored in the storage unit is a color image or a monochrome image according to the color determination result stored in the storage unit, and storing a determination result in the storage unit;

outputting a test pattern including at least an edge portion of a black region on a recording medium;

detecting a difference between a color determination result with respect to the test pattern output on the recording medium and a color determination result with respect to the test pattern output on a standard recording medium set as a standard in advance, and storing a detected color determination difference detection result in the storage unit; and adjusting a white pixel determination threshold and a black pixel determination threshold used for the automatic color determination according to the color determination difference detection result stored in the storage unit.

\* \* \* \* \*